United States Patent
Ori et al.

(10) Patent No.: US 7,680,014 B2
(45) Date of Patent: Mar. 16, 2010

(54) OBJECTIVE OPTICAL SYSTEM AND OPTICAL PICKUP DEVICE USING IT

(75) Inventors: Tetsuya Ori, Koshigaya (JP); Yu Kitahara, Saitama (JP); Masao Mori, Saitama (JP); Toshiaki Katsuma, Tokyo (JP)

(73) Assignee: Fujinon Corporation, Saitama (JP)

( * ) Notice: Subject to any disclaimer, the term of this patent is extended or adjusted under 35 U.S.C. 154(b) by 1489 days.

(21) Appl. No.: 10/972,670

(22) Filed: Oct. 26, 2004

(65) Prior Publication Data

US 2005/0117496 A1    Jun. 2, 2005

(30) Foreign Application Priority Data

Oct. 27, 2003  (JP)  .............................. 2003-365482
Mar. 29, 2004  (JP)  .............................. 2004-097049

(51) Int. Cl.
   *G11B 7/135*  (2006.01)
(52) U.S. Cl. .............................. 369/112.05; 369/112.23
(58) Field of Classification Search ............ 369/112.03, 369/112.08, 112.23, 112.05, 112.01
See application file for complete search history.

(56) References Cited

U.S. PATENT DOCUMENTS

| | | | |
|---|---|---|---|
| 5,936,782 A | 8/1999 | Nomura et al. | |
| 6,449,095 B1 * | 9/2002 | Ohtaki et al. | 359/566 |
| 6,590,851 B1 | 7/2003 | Kim et al. | |
| 6,795,248 B2 * | 9/2004 | Kimura | 359/565 |
| 6,870,805 B1 | 3/2005 | Arai et al. | |
| 7,161,890 B2 | 1/2007 | Komma et al. | |
| 7,286,463 B2 | 10/2007 | Kitahara et al. | |
| 7,369,481 B2 | 5/2008 | Kimura et al. | |
| 7,414,951 B2 | 8/2008 | Katayama | |
| 7,443,779 B2 | 10/2008 | Kitahara et al. | |
| 7,457,223 B2 | 11/2008 | Katsuma et al. | |

(Continued)

FOREIGN PATENT DOCUMENTS

JP    2003-323735    11/2003

OTHER PUBLICATIONS

U.S. Appl. No. 10/936,765, filed Sep. 9, 2004, Tetsuya Ori et al.

(Continued)

*Primary Examiner*—Thang V Tran
*Assistant Examiner*—Thomas D Alunkal
(74) *Attorney, Agent, or Firm*—Arnold International; Jon W. Henry; Bruce Y. Arnold

(57) ABSTRACT

An objective optical system is formed of a diffractive optical element with a diffractive surface formed on a virtual plane and an objective lens for focusing three collimated light beams of three different wavelengths at three different numerical apertures onto desired positions of three different recording media with substrates that include different thicknesses, such as an AOD, a DVD, and a CD, that introduce different amounts of spherical aberration in the focused beams. The objective optical system provides compensating spherical aberration to the three light beams by varying the distance between the diffractive optical element and the objective lens with the recording medium being used. The objective optical system focuses second-order diffracted light of one wavelength and first-order diffracted light of the other two wavelengths. An optical pickup device includes the objective optical system, the recording media, and a light source that provides the three light beams.

33 Claims, 25 Drawing Sheets

U.S. PATENT DOCUMENTS

| | | | |
|---|---|---|---|
| 2001/0008513 A1* | 7/2001 | Arai et al. | 369/112.08 |
| 2002/0135891 A1* | 9/2002 | Kimura et al. | 359/795 |
| 2002/0172132 A1* | 11/2002 | Takeuchi et al. | 369/112.08 |
| 2003/0185134 A1* | 10/2003 | Kimura et al. | 369/112.08 |
| 2003/0227858 A1* | 12/2003 | Komma | 369/112.08 |
| 2003/0231536 A1* | 12/2003 | Mizuno et al. | 365/200 |
| 2004/0022164 A1* | 2/2004 | Nishioka et al. | 369/112.05 |
| 2004/0213134 A1* | 10/2004 | Takada et al. | 369/112.08 |
| 2005/0117496 A1 | 6/2005 | Ori et al. | |
| 2005/0259554 A1 | 11/2005 | Katsuma et al. | |

OTHER PUBLICATIONS

Sumito Nishioka et al., "BD/DVD/CG Compatible Optical Pickup Technology", excerpt from 50th Lecture of Applied Physics Assoc., Univ. of Kanagava, Mar. 2003, p. 1250.

* cited by examiner

OBJECTIVE OPTICAL SYSTEM AND OPTICAL PICKUP DEVICE USING IT

TECHNICAL FIELD OF THE INVENTION

The present invention relates to an objective optical system for an optical recording medium that, when recording or reproducing information, efficiently converges light of any one of three different wavelengths onto an appropriate corresponding recording medium according to standardized characteristics such as the numerical aperture of the objective optical system used, the wavelength of the light selected, and the substrate thickness of the optical recording medium. The present invention also relates to an objective optical system for an optical recording medium where a diffractive optical element is used to diffract light in order to efficiently converge light of any one of the three wavelengths onto a corresponding one of the three optical recording media, and it also relates to an optical pickup device using such an objective optical system.

BACKGROUND OF THE INVENTION

In recent years, a variety of optical recording media have been developed and optical pickup devices that carry out recording and reproducing using two alternative types of optical recording media have been known. For example, devices that carry out recording or reproducing with either a DVD (Digital Versatile Disk) or a CD (Compact Disk including CD-ROM, CD-R, CD-RW) have been used. For these two optical recording media, the DVD uses visible light having a wavelength of approximately 657 nm for improved recording densities while the CD is required to use near-infrared light having a wavelength of approximately 790 nm because there are some recording media that have no sensitivity to visible light. A single optical pickup device, known as a two-wavelength-type pickup device, uses incident light of these two different wavelengths. The two optical recording media described above require different numerical apertures (NA) due to their different features. For example, the DVD is standardized to use a numerical aperture of about 0.65 and the CD is standardized to use a numerical aperture in the range of 0.45-0.52. Additionally, the thicknesses of the two types of recording disks, including the thicknesses of the protective layers or substrates made of polycarbonate (PC), are different. For example, the DVD may have a substrate thickness of 0.6 mm and the CD may have a substrate thickness of 1.2 mm.

As described above, because the substrate thickness of the optical recording medium is standardized and differs according to the type of optical recording medium, the amount of spherical aberration introduced by the substrate is different based on the different standardized thicknesses of the substrates of the different recording media. Consequently, for optimum focus of each of the light beams on the corresponding optical recording medium, it is necessary to optimize the amount of spherical aberration in each light beam at each wavelength for recording and reproducing. This makes it necessary to design the objective lens with different focusing effects according to the light beam and recording medium being used.

Additionally, in response to rapid, almost daily, increases of data capacity, the demand for an increase in the recording capacity of recording media has been strong. It is known that the recording capacity of an optical recording medium can be increased by using light of a shorter wavelength and by increasing the numerical aperture (NA) of an objective lens. Concerning a shorter wavelength, the development of a semiconductor laser with a shorter wavelength using a GaN substrate (for example, a semiconductor laser that emits a laser beam of 408 nm wavelength) has advanced to the point where this wavelength is now available for use.

With the development of short wavelength semiconductor lasers, research and development of AODs (Advanced Optical Disks), also known as HD-DVDs, that provide approximately 20 (GB of data storage on a single layer of a single side of an optical disk by using short wavelength light is also progressing. As the AOD standard, the numerical aperture and disk thickness are selected to be close to, but slightly different from, those of DVDs, with the numerical aperture (NA) and disk substrate thickness for an AOD being set at 0.65 and 0.6 mm, respectively.

Furthermore, research and development of Blu-ray disk (BD) systems that use a shorter wavelength of disk illuminating light, similar to AOD systems, has progressed, and the standardized values of numerical aperture and disk thickness for these systems are completely different from the corresponding DVD and CD values, with a numerical aperture (NA) of 0.85 and a disk substrate thickness of 0.1 mm being standard. Unless otherwise indicated, hereinafter, AODs and Blu-ray disks collectively will be referred to as "AODs."

The development of an optical pickup device that can be used for three different types of optical recording media, such as AODs, DVDs and CDs as described above, has been demanded and objective optical systems for mounting in such devices have already been proposed. For example, an objective optical system that includes a diffractive optical element with a refractive surface and a diffractive surface and a biconvex lens is described on page 1250 of Extended Abstracts, $50^{th}$ Japan Society of Applied Physics and Related Societies (March, 2003). The objective optical system described in this publication is designed so that: second-order diffracted light from the diffractive optical element is used for a BD optical recording medium; first-order diffracted light from the diffractive optical element is used for a DVD optical recording medium; and also first-order diffracted light from the diffractive optical element is used for a CD optical recording medium. The rear surface of the diffractive optical element (the side opposite the light source) is concave in order to aid in correcting spherical aberration that is created by the difference in the thickness of the protective layer, that is, the substrate of each optical recording medium. The spherical aberration created varies with the thickness of the protective layer. Chromatic aberration is also improved relative to a single component lens by the diffractive optical element having the diffractive surface as its front surface, that is, the surface on the light source side, and the concave surface as its rear surface.

In the technology described in the above-mentioned publication, in order to reduce the generation of coma associated with a shift of the objective optical system relative to an incident light beam, when recording or reproducing information to or from the BD, the design is such that the light incident on the diffractive optical element is converging light. Further, when recording or reproducing information to or from the DVD or the CD, the design is such that the light incident on the diffractive optical element is collimated light and diverging light, respectively.

However, there presently is strong demand for a compact device that provides greater freedom in positioning the objective optical system within the recording and reproducing device. In order to achieve this, it is necessary to create a design such that collimated light, rather than diverging or converging light, be incident on the objective optical system for all three of the light beams that are being used. Additionally, if diverging or converging light is incident on the diffractive optical element, there are problems of the diffraction efficiency being reduced due to the angle of incidence of the light rays on the diffractive grooves of the diffractive optical element being tilted from the desired angle of incidence, and there are problems of the stability of the tracking being decreased.

BRIEF SUMMARY OF THE INVENTION

The present invention relates to an objective optical system for optical recording media that can efficiently focus each of three light beams on a corresponding one of three optical recording media with different technical standards of the substrate thickness, the wavelengths of the three light beams, and the numerical aperture (NA) of the objective optical system for each of the three light beams. Using a diffractive optical element in the objective optical system of the present invention allows for increased freedom in selecting the position of the objective optical system and improved diffraction efficiency of the light beam, and concurrently increases the stability of the tracking. The present invention further relates to such an objective optical system with the diffractive optical element being also a lens element of the objective optical system. The present invention further relates to an optical pickup device using this objective optical system.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1A:
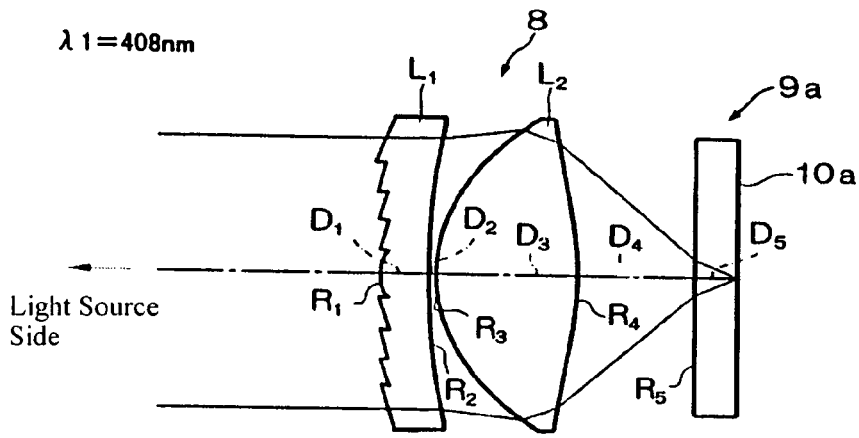
FIGS. 1A-1C are schematic diagrams that depict cross-sectional views of the objective optical system of Embodiment 1 of the present invention, with FIG. 1A showing the operation of the objective optical system when used with a first optical recording medium 9a, with FIG. 1B showing the operation of the objective optical system when used with a second optical recording medium 9b, and with FIG. 1C showing the operation of the objective optical system when used with a third optical recording medium 9c.

The present invention relates to an objective optical system for optical recording media that can be used to focus each of three different light beams of three different wavelengths, $\lambda 1$, $\lambda 2$, and $\lambda 3$, from a light source to a different desired position for each of the first, second and third optical recording media of substrate thicknesses, T1, T2, and T3, respectively, for recording and reproducing information. As herein defined, unless otherwise indicated, the term "light source" refers to the source of the three different light beams of three different wavelengths, whether the light beams originate from a single light emitting source or from separate light emitting sources, such as semiconductor lasers. Additionally, the term "light source" may also include various optical elements, including beamsplitters, mirrors, and converging lenses, which for one or more of the light beams of wavelengths $\lambda 1$, $\lambda 2$, and $\lambda 3$ may operate as a collimator lens to provide a collimated light beam incident on the objective optical system.

The objective optical system includes, from the light source side: a diffractive optical element with one surface of the diffractive optical element being a diffractive surface defined by a phase function $\Phi$, as will be discussed in detail later; and an objective lens of positive refractive power with both surfaces being rotationally symmetric aspheric surfaces. The phase function $\Phi$ is chosen so that the objective optical system is able to focus each of the three different light beams of three different wavelengths, $\lambda 1$, $\lambda 2$, and $\lambda 3$, at a different desired position for each of the first, second and third optical recording media of substrate thicknesses, T1, T2, and T3, respectively.

The objective optical system is constructed so that collimated light of each wavelength, $\lambda 1$, $\lambda 2$, and $\lambda 3$, diffracted by the diffractive optical element is efficiently focused onto the desired position of the corresponding optical recording media of substrate thickness, T1, T2, and T3, respectively. In order for this to occur at all three wavelengths, the diffraction order of the diffracted light of at least one wavelength must be different from the diffraction order of the diffracted light of at least one other wavelength.

Additionally, the distance between the diffractive optical element and the objective lens when light of one wavelength is being focused on its corresponding recording medium with a certain substrate thickness must be different from the distance between the diffractive optical element and the objective lens when light of at least one other wavelength is being focused on its corresponding recording medium with a different substrate thickness. Specific conditions related to these distances will be discussed below with regard to each of Embodiments 1-12 of the present invention in term of "d" distances, d1, d2, and d3, corresponding to wavelengths $\lambda 1$, $\lambda 2$, and $\lambda 3$.

Additionally, the three wavelengths, the diffraction orders of light used, the numerical apertures NA1, NA2, and NA3 of the objective optical system associated with the wavelengths $\lambda 1$, $\lambda 2$, and $\lambda 3$, respectively, and the substrate thickness of T1, T2, and T3, respectively, of the three recording media are selected so that the numerical aperture of the objective optical system is never larger for light of a larger wavelength being used and so that the substrate thickness is never smaller for light of a larger wavelength being used. The varying distance along the optical axis between the diffractive optical element and the objective lens when light beams of different wavelengths $\lambda 1$, $\lambda 2$, and $\lambda 3$ are used are denoted as d1, d2, and d3, respectively.

In summary, throughout the following descriptions the following definitions apply:

NA1 is the numerical aperture of the objective optical system for light of the first wavelength $\lambda 1$ that is focused on the optical recording medium of substrate thickness T1,

NA2 is the numerical aperture of the objective optical system for light of the second 20 wavelength $\lambda 2$ that is focused on the optical recording medium of substrate thickness T2,

NA3 is the numerical aperture of the objective optical system for light of the third wavelength $\lambda 3$ that is focused on the optical recording medium of substrate thickness T3, d1 is the distance along the optical axis between the diffractive optical element and the objective lens of the objective optical system for light of the first wavelength $\lambda 1$ that is focused on the optical recording medium of substrate thickness T1, d2 is the distance along the optical axis between the diffractive optical element and the objective lens of the objective optical system for light of the second wavelength $\lambda 2$ that is focused on the optical recording medium of substrate thickness T2, and d3 is the distance along the optical axis between the diffractive optical element and the objective lens of the objective optical system for light of the third wavelength $\lambda 3$ that is focused on the optical recording medium of substrate thickness T3.

Additionally, in the objective optical system of the present invention, the following conditions are satisfied:

$$\lambda 1 < \lambda 2 < \lambda 3 \qquad \text{Condition (1)}$$

$$NA1 \geq NA2 > NA3 \qquad \text{Condition (2)}$$

$$T1 \leq T2 < T3 \qquad \text{Condition (3).}$$

As a well known technology, for example, in the optical pickup device described in the publication of Japanese Laid-Open Patent Application 2001-195769, it has been proposed to use all collimated light beams incident on an objective optical system with optical recording media of next generation high density optical disks, such as an AOD, a DVD and a CD, that includes a single element lens with at least one surface being a diffractive surface. This publication considers correcting the different amounts of spherical aberration that are generated due to the different substrate thicknesses of each optical recording medium and the chromatic aberration that is generated at the objective lens even with this simple construction. However, this publication does not describe any particular concern about the diffraction order of the light diffracted by the diffractive optical element, and the design is such that each light beam that corresponds to each optical recording medium and converges onto each corresponding optical recording medium is of the same diffraction order. This makes it very difficult to have maximum efficiency with the light beams of the three different wavelengths used.

In contrast, in the present invention, by using different diffraction orders of diffracted light and varying the distance between the diffractive optical element and the objective lens, the objective optical system produces spherical aberration that efficiently compensates for the different contributions of spherical aberration introduced by the different substrate thicknesses T1, T2, and T3 for the three light beams of different wavelengths $\lambda 1$, $\lambda 2$, and $\lambda 3$ with all three light beams being incident on the objective optical system as collimated light beams. Additionally, the present invention, particularly by using all collimated light beams, allows greater freedom in the positioning of the objective optical system, improvement in tracking efficiency, as well as a compact design. Furthermore, by using all collimated beams incident on the objective optical system, problems of oblique light rays being incident on the diffraction grooves, as occurs with incident convergent or divergent light beams, are eliminated to improve diffraction efficiency.

Varying the distances between the diffractive optical element and the objective lens may be used not only to compensate for spherical aberration due to different standardized substrate thickness, but may in general compensate for spherical aberration introduced, including that due to variations in the manufacture of optical recording media and a multilayer disk, such as a two-layer disk.

The invention will now be discussed in general terms with reference to FIGS. 1A-1C that show the geometry of the objective optical system of Embodiment 1 of the present invention and FIG. 25 that shows an optical pickup device using the objective optical system of Embodiment 1. The figures show the elements of the objective optical system schematically. In order to prevent FIG. 25 from being too complicated, only one pair of light rays from each light beam are illustrated at every location of the objective optical system in FIG. 25, even where light of more than one wavelength is present, including at the prisms 2a and 2b.

Figure 25:
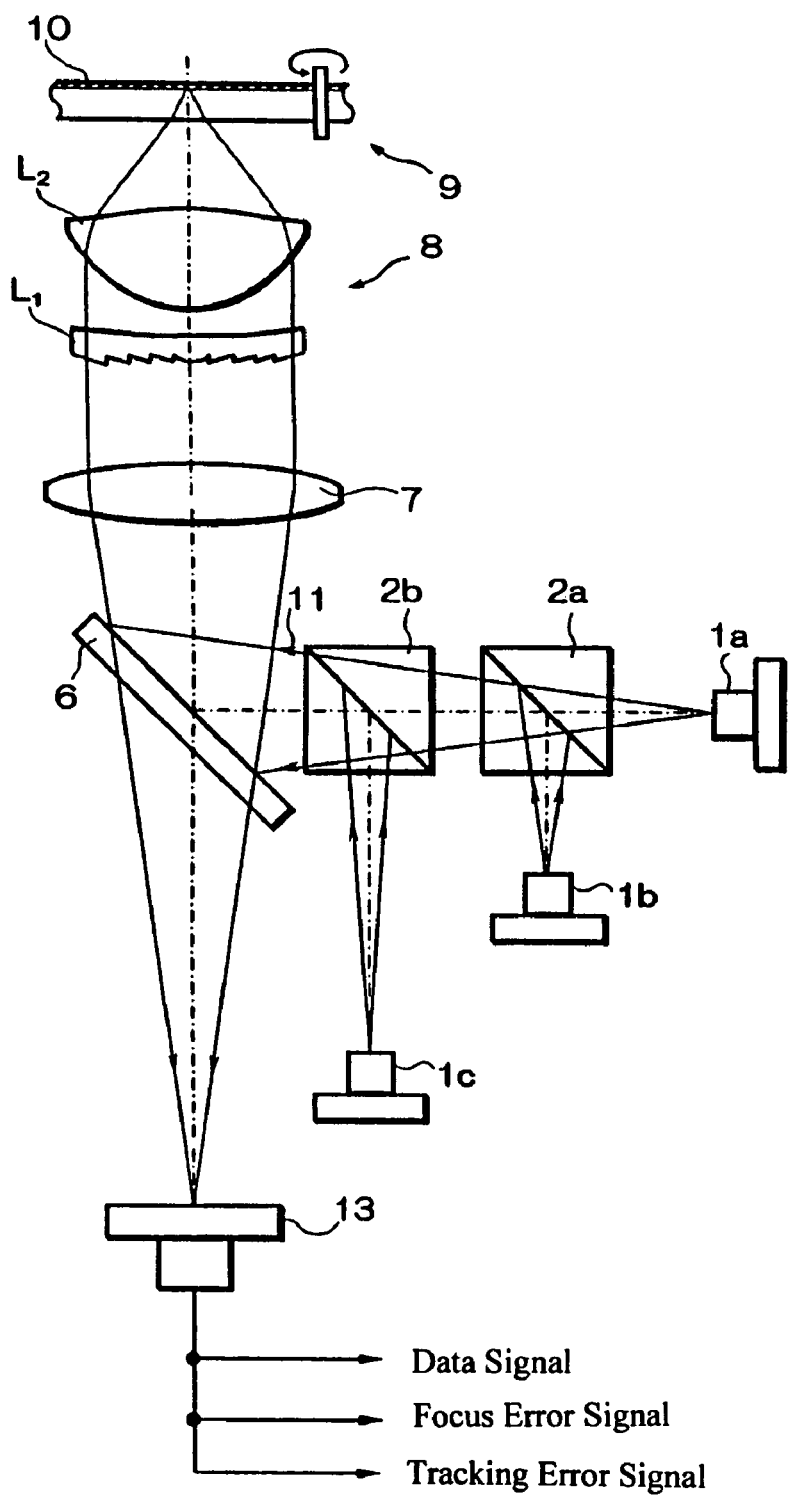
FIG. 25 is a schematic diagram of an optical pickup device using the objective optical system of FIGS. 1A-1C. In a similar manner the other embodiments of the objective optical systems of the present invention may be used in an optical pickup device.

As shown in FIG. 25, a laser beam 11 that is emitted from one of the semiconductor lasers 1a, 1b, and 1c is reflected by a half mirror 6, is collimated by a collimator lens 7, and is focused by the objective optical system 8 onto a recording area 10 of an optical recording medium 9.

Figure 1B:
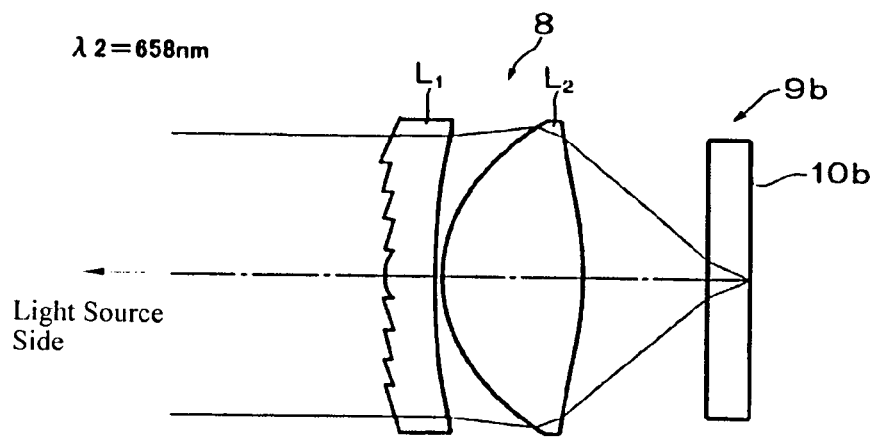
Figure 1C:
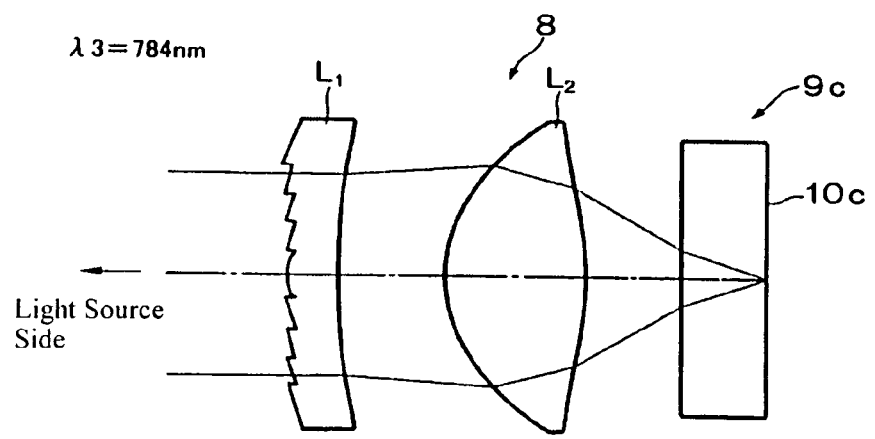

More specifically, as shown in FIGS. 1A-1C, the arrangement includes an optical recording medium 9a that is an AOD with a substrate thickness T1 of 0.6 mm used with a light beam of wavelength $\lambda 1$ that is equal to 408 nm and with a numerical aperture NA1 of 0.65 (FIG. 1A), an optical recording medium 9b that is a DVD with a substrate thickness T2 of 0.6 mm used with a light beam of wavelength $\lambda 2$ that is equal to 658 nm and with a numerical aperture NA2 of 0.65 (FIG. 1B), and an optical recording medium 9c that is a CD with a substrate thickness T3 of 1.2 mm used with a light beam of wavelength $\lambda 3$ that is equal to 784 nm and with a numerical aperture NA3 of 0.51 (FIG. 1C).

The semiconductor laser 1a emits the visible laser beam having the wavelength of approximately 408 nm ($\lambda 1$) for AODs. The semiconductor laser 1b emits the visible laser beam having the wavelength of approximately 658 nm ($\lambda 2$) for DVDs. The semiconductor laser 1c emits the near-infrared laser beam having the wavelength of approximately 784 nm ($\lambda 3$) for CDs such as CD-R (recordable optical recording media) (hereinafter the term CD generally represents CDs of all types).

The arrangement of FIG. 25 does not preclude semiconductor lasers 1a-1c providing simultaneous outputs. However, it is preferable that the lasers be used alternately depending on whether the optical recording media 9 of FIG. 25 is specifically, as shown in FIGS. 1A-1C, an AOD 9a, a DVD 9b, or a CD 9c. As shown in FIG. 25 the laser beam output from the semiconductor lasers 1a, 1b irradiates the half mirror 6 by way of prisms 2a, 2b, and the laser beam output from the semiconductor laser 1c irradiates the half mirror 6 by way of the prism 2b.

The collimator lens 7 is schematically shown in FIG. 25 as a single lens element. However, it is desirable to use a collimator lens made up of more than one lens element in order to better correct chromatic aberration of the collimator lens 7.

In the optical pickup device of the present invention, each of the optical recording media 9, as shown in FIG. 25, whether an AOD 9a, a DVD 9b or a CD 9c shown in FIGS. 1A-1C, respectively, must be arranged at a predetermined position along the optical axis, for example, on a turntable, so that the recording region 10 of FIG. 25 (one of recording regions 10a, 10b, and 10c of an AOD 9a, a DVD 9b and a CD 9c of FIGS. 1A-1C) is positioned at the focus of the light beam of the corresponding wavelength ($\lambda 1$, $\lambda 2$, and $\lambda 3$ for recording regions 10a, 10b, and 10c, respectively) in order to properly record signals and reproduce recorded signals.

In the recording region 10, pits carrying signal information are arranged in tracks. The reflected light of a laser beam 11 is made incident onto the half mirror 6 by way of the objective optical system 8 and the collimator lens 7 while carrying the signal information, and the reflected light is transmitted through the half mirror 6. The transmitted light is then incident on a four-part photodiode 13. The respective quantities of light received at each of the four parts of the four-part photodiode 13 are converted to electrical signals that are operated on by calculating circuits (not shown in the drawings) in order to obtain data signals and respective error signals for focusing and tracking.

Because the half mirror 6 is inserted into the optical path of the return light from the optical recording media 9 at a forty-five degree angle to the optical axis, the half mirror 6 introduces astigmatism into the light beam, as a cylindrical lens may introduce astigmatism, whereby the amount of focusing error may be determined according to the form of the beam spot of the return light on the four-part photodiode 13. Also, a grating may be inserted between the semiconductor lasers 1a-1c and the half mirror 6 so that tracking errors can be detected using three beams.

As shown in FIGS. 1A-1C and FIG. 25, the objective optical system 8 of the present invention includes, in order from the light source side, a diffractive optical element $L_1$, with one surface being a diffractive surface and the other surface being a refractive surface, which is a concave surface as shown in FIGS. 1A-1C, and an objective lens $L_2$ of positive refractive power, which includes two rotationally symmetric aspheric surfaces in the embodiment of FIGS. 1A-1C. The diffractive surface is defined by the phase function $\Phi$.

Additionally, in the use of two different types of optical recording media with different disk thicknesses related to different substrate thicknesses, it has been known to use a diffractive optical element with a diffractive surface to assist in optimizing corrections of various aberrations, such as spherical aberration, for light beams of different wavelengths corresponding to the different types of optical recording media. With these different types of optical recording media, the amount of spherical aberration is different mainly due to the differences in the thicknesses of the substrates that are protective layers. However, the use of the diffractive surface of the diffractive optical element results in different focusing effects for the light beams of different wavelengths used with the different types of recording media that enables excellent correction of aberrations even with both lights beams being incident as collimated beams, which also allows for greater freedom in the positioning of the objective optical system. But when more than two types of recording media, all with different substrate thicknesses are used and using light beams of different wavelengths, it is difficult to satisfactorily correct aberrations, especially spherical aberrations, using all collimated light beams. In the present invention, excellent correction is possible by appropriately changing the distance between the diffractive optical element $L_1$ and the objective lens $L_2$, as shown in FIGS. 1A-1C, based on the recording medium and wavelength of the light beam being used.

The lens surfaces that are aspheric are defined using the following aspherical equation:

$$Z=[(C \cdot Y^2)/\{1+(1-K \cdot C^2 \cdot Y^2)^{1/2}\}]+\Sigma A_i \cdot Y^{2i} \quad \text{Equation (A)}$$

where
  Z is the length (in mm) of a line drawn from a point on the aspheric Jens surface at a distance Y from the optical axis to the tangential plane of the aspheric surface vertex,
  C is the curvature (=1/the radius of curvature, R in mm) of the aspheric lens surface on the optical axis,
  Y is the distance (in mm) from the optical axis,
  K is the eccentricity, and
  $A_i$ is an aspheric coefficient.

By using rotationally symmetric lens surfaces expressed in terms of Equation (A), desired focusing with excellent correction of aberrations can be provided on a selected recording medium 9 and excellent recording and reproducing of information can be achieved.

Preferably, as shown in FIGS. 1A-1C and FIG. 25, the surface of the diffractive optical element $L_1$ that is on the light source side is the diffractive surface, and, as recited above, it is preferable that the diffractive surface be formed as a diffractive structure on a virtual plane, that is, the surface where the diffractive structure is formed would be planar but for the diffractive structures of the diffractive surface, and that the virtual plane be perpendicular to the optical axis. Preferably, the cross-sectional configuration of the diffractive surface is serrated so as to define a so-called kinoform. FIGS. 1A-1C and FIG. 25 exaggerate the actual size of the serrations of the diffractive surfaces.

The diffractive surface adds a difference in optical path length equal to $m \cdot \lambda \cdot \Phi/(2\pi)$ to the diffracted light, where $\lambda$ is the wavelength, $\Phi$ is the phase function of the diffractive optical surface, and m is the order of the diffracted light that is focused on a recording medium 9. The phase function $\Phi$ is given by the following equation:

$$\Phi = \Sigma W_i \cdot Y^{2i} \quad \text{Equation (B)}$$

where
  Y is the distance in mm from the optical axis; and
  $W_i$ is a phase function coefficient.

The specific heights of the serrated steps of the diffractive surface of the diffractive optical element $L_1$ are based on ratios of diffracted light of each order for the light beams of different wavelengths $\lambda 1$, $\lambda 2$, and $\lambda 3$. Additionally, the outer diameter of the diffractive surface can be determined by taking into consideration the numerical aperture (NA) and the beam diameter of the incident laser beam 11 of each of the three wavelengths. It is preferable that the diffractive surface formed on the diffractive optical element $L_1$ and the rotationally symmetric aspheric surfaces formed on the objective lens $L_2$ are determined to focus each of the three beams of light with the three wavelengths, $\lambda 1$, $\lambda 2$, and $\lambda 3$, on a corresponding recording region 10, as shown in FIG. 25 (10a, 10b, 10c, as shown in FIGS. 1A-1C, respectively) with excellent correction of aberrations.

Furthermore, it is preferable that diffracted light of maximum intensity be used to focus on the recording media for all three wavelengths, $\lambda 1$, $\lambda 2$, and $\lambda 3$, and that the diffraction order of light of the first wavelength $\lambda 1$ used be different from the diffraction order of light of each of the second and third wavelengths $\lambda 2$ and $\lambda 3$. This helps achieve high diffraction efficiency for light beams of all three wavelengths. Additionally, it is preferable that the diffractive surface have a configuration so as to provide the greatest quantity of diffracted light in the second-order for the laser beam for the AOD with a light wavelength of 408 nm ($\lambda 1$), so as to provide the greatest quantity of diffracted light in the first-order for the laser beam for the DVD with a light wavelength of 658 nm ($\lambda 2$), and in addition, so as to provide the greatest quantity of diffracted light in the first-order for the laser beam for the CD with a light wavelength of 784 nm ($\lambda 3$). In more general terms, second-order diffracted light of the shortest wavelength is focused on the corresponding recording medium 9a, and first-order diffracted light of each of the other two wavelengths is focused the corresponding recording media 9b and 9c. The selection of these orders enables a design where the diffractive grooves on the diffractive optical surface become shallow, and it also enables the convergence of the light beams of all three wavelengths with high efficiency without making it difficult to form an appropriate mold or to perform an acceptable molding process.

As mentioned above, by providing different diffraction orders of diffracted light for the laser beam for the AOD and for the laser beam for the DVD, and also by providing different orders of diffracted light for the laser beam for the AOD and for the laser beam for CD, the three light beams having different wavelengths are efficiently focused at the desired positions.

In addition, the diffractive optical element $L_1$ having negative refractive power enables extending the operating distance and prevents the objective lens $L_2$ from colliding with a recording medium. However, the diffractive optical element $L_1$ having positive refractive power enables the objective lens $L_2$ to be smaller, which assists in achieving compactness of the device.

The objective optical system 8 may be constructed so that each of two of the three light beams of wavelengths $\lambda 1$, $\lambda 2$, and $\lambda 3$ are focused onto a corresponding one of the three recording media 9a, 9b, and 9c, respectively, with equal air spaces, that is, equal distances $D_2$, between the diffractive optical element $L_1$ and the objective lens $L_2$ that differ from the air space associated with the third wavelength. Embodiments having two equal air spaces make the design of the mechanisms for moving the diffractive optical element $L_1$ and/or the objective lens $L_2$ easier. Embodiments 1-6 of the present invention, discussed below, have this construction.

Alternatively, the objective optical system 8 may be constructed so that each of the three light beams of wavelengths $\lambda 1$, $\lambda 2$, and $\lambda 3$ are focused onto a corresponding one of the three recording media 9a, 9b, and 9c, respectively, with air spaces, that is, distances $D_2$, between the diffractive optical element $L_1$ and the objective lens $L_2$ that all differ from one another. With such a construction, different arrangement positions can be established corresponding to each optical recording medium, so that the degree of design freedom can be enhanced. Embodiments 7-12 of the present invention, discussed below, have this construction.

Additionally, in the objective optical system 8 of the present invention, the diffractive optical element $L_1$ and the objective lens $L_2$ may either or both be made of plastic. Making these optical elements of plastic is advantageous in reducing manufacturing costs and making manufacturing easier, and in making the system lighter, which may assist in high speed recording and replaying. In particular, using a mold makes manufacturing the diffractive optical element much easier than many other processes of manufacture.

Alternatively, one or both of the diffractive optical element $L_1$ and the objective lens $L_2$ may be made of glass. Glass is advantageous for several reasons: it generally has optical properties that vary less with changing temperature and humidity than for plastic; and appropriate glass types are readily available for which the light transmittance decreases less than for plastic, even at relatively short wavelengths.

Twelve embodiments of the present invention will now be set forth in detail.

Embodiment 1

FIGS. 1A-1C are schematic diagrams that depict cross-sectional views of the objective optical system of Embodiment 1 of the present invention, with FIG. 1A showing the operation of the objective optical system when used with the optical recording medium 9a, with FIG. 1B showing the operation of the objective optical system when used with a second optical recording medium 9b, and with FIG. 1C showing the operation of the objective optical system when used with a third optical recording medium 9c. As shown in FIGS. 1A-1C, the objective optical system of the present invention includes, in order from the light source side, a diffractive optical element $L_1$, with one surface being a diffractive surface and the other surface being a concave spherical surface, and a biconvex objective lens $L_2$ with two rotationally symmetric aspheric surfaces. Additionally, the diffractive surface is formed as a diffractive structure on a virtual plane, that is, the surface where the diffractive structure is formed is planar but for the diffractive structures of the diffractive surface, and the virtual plane is perpendicular to the optical axis. The diffractive surface is defined by the phase function $\Phi$.

The diffractive surface is formed with a cross-sectional configuration of concentric serrations that define a grating. Second-order diffracted light diffracted by the diffractive optical element $L_1$ is focused onto the desired position at recording region 10a of the first optical recording medium 9a when the first light beam of wavelength $\lambda 1$ is incident on the diffractive optical element as collimated light; first-order diffracted light diffracted by the diffractive optical element $L_1$ is focused onto the desired position at recording region 10b of the second optical recording medium 9b when the second light beam of wavelength $\lambda 2$ is incident on the diffractive optical element as collimated light; and first-order diffracted light diffracted by the diffractive optical element $L_1$ is focused onto the desired position at recording region 10c of the third optical recording medium 9c when the third light beam of wavelength $\lambda 3$ is incident on the diffractive optical element as collimated light.

As shown in FIGS. 1A-1C, the objective optical system 8 of this embodiment uses a construction in which the spacing between diffractive optical element $L_1$ and the objective lens $L_2$ is changed in accordance with the type of recording media. Namely, the spacing $D_2$ between the diffractive optical element $L_1$ and the objective lens $L_2$ is established when the recording and reproduction of information are performed for the AOD 9a as shown in FIG. 1A ($D_2$=d1) and for the DVD 9b as shown in FIG. 1B ($D_2$=d2), while a larger spacing between the diffractive optical element $L_1$ and the objective lens $L_2$ is established when recording and reproduction of information are performed for the CD 9c as shown in FIG. 1C ($D_2$=d3).

In Embodiment 1 the following conditions are satisfied:

| | |
|---|---:|
| $\lambda 1 < \lambda 2 < \lambda 3$ | Condition (1) |
| $NA1 \geq NA2 > NA3$ | Condition (2) |
| $T1 \leq T2 < T3$ | Condition (3) |
| $d1 < d3$ | Condition (4) |
| $d2 < d3$ | Condition (5) |
| $d1 = d2$ | Condition (6) |

Condition (6) taken together with either Condition (4) or Condition (5) makes the other of Conditions (4) and (5) true. However, any pair of the above Conditions (4)-(6) define different features that may variously relate to the present invention.

Generally, an objective lens system satisfying these conditions provides good correction of spherical aberration created by the different substrate thicknesses T1, T2, and T3 of the different recording media for the different wavelengths $\lambda 1$, $\lambda 2$, and $\lambda 3$, respectively. In particular, an objective optical system of Embodiment 1 can be used effectively in the recording and reproduction of information for an AOD 9a and a DVD 9b in which the substrate thicknesses of the recording media are both 0.6 mm, enabling correction of aberrations, such as spherical aberration, with collimated light beams incident on the objective optical system 8, as well as providing similar correction by the objective optical system of Embodiment 1 for a CD 9c with a substrate thickness of the recording medium of 1.2 mm with a collimated incident beam by increasing the distance between the diffractive optical element having negative refractive power as a whole and the objective lens having positive refractive power.

As indicated in FIGS. 1A-1C, the objective optical system 8 favorably focuses light of each wavelength, $\lambda 1$ of 408 nm, $\lambda 2$ of 658 nm, and $\lambda 3$ of 784 nm, onto a respective recording region 10a, 10b, or 10c of respective recording media 9a, 9b, and 9c, which are an AOD, a DVD, and a CD, respectively. Additionally, as shown in FIGS. 1A-1C, the objective lens operates with an infinite conjugate on the light source side with the substantially collimated light beams of all three wavelengths being incident on the objective lens 8.

Table 1 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1$=408 nm for the AOD 9a, $\lambda 2$=658 nm for the DVD 9b, and $\lambda 3$=784 nm for the CD 9c), and the refractive indexes at the three used wavelengths.

TABLE 1

| # | Surface Type or Radius of Curvature | Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | diffractive | 0.500 | 0.500 | 0.500 | 1.55636 | 1.54076 | 1.53704 |
| 2 | aspheric | 0.100 | 0.100 | 1.500 | | | |
| 3 | aspheric | 2.000 | 2.000 | 2.000 | 1.55636 | 1.54076 | 1.53704 |
| 4 | aspheric | 1.654 | 1.750 | 1.349 | | | |
| 5 | ∞ | 0.600 | 0.600 | 1.200 | 1.62000 | 1.58000 | 1.57000 |
| 6 | ∞ | | | | | | |

Table 2 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 2

| | $\lambda 1 = 408$ nm | $\lambda 2 = 658$ nm | $\lambda 3 = 784$ nm |
|---|---|---|---|
| diaphragm diameter | 3.90 | 4.00 | 3.00 |
| focal length, f | 3.00 | 3.10 | 3.05 |
| numerical aperture, NA | 0.65 | 0.65 | 0.51 |
| light source position | ∞ | ∞ | ∞ |
| diffraction order used | 2 | 1 | 1 |

Table 3 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 3 are zero.

TABLE 3

| | $2^{nd}$ Surface | $3^{rd}$ Surface | $4^{th}$ Surface |
|---|---|---|---|
| C | 5.8884999E-2 | 4.6935794E-1 | -2.2559536E-1 |
| K | 1.0000000 | 4.4737881E-2 | 5.0667929E-2 |
| $A_2$ | 1.0572906E-2 | 1.1590103E-2 | 9.2307566E-3 |
| $A_3$ | -2.4882627E-3 | -1.8971099E-3 | 2.0005479E-3 |
| $A_4$ | 5.3486407E-4 | 6.4028302E-4 | -6.1233375E-4 |
| $A_5$ | -6.4589156E-5 | -6.2331203E-5 | 4.7090817E-5 |

Table 4 below lists the values of the phase function coefficients $W_1$-$W_5$ of the 1st surface that forms the diffractive surface of the diffractive optical element $L_1$ of this embodiment that are used in Equation (B) above. Phase function coefficients not listed in Table 4 are zero. An "E" in the data indicates that the number following the "E" is the exponent to the base 10. For example, "1.0E-2" represents the number $1.0 \times 10^{-2}$.

TABLE 4

| | |
|---|---|
| $W_1$ | -8.3102036E+1 |
| $W_2$ | 5.4894629E-1 |
| $W_3$ | 2.3751721 |
| $W_4$ | 1.2912872E-1 |
| $W_5$ | -4.3884760E-2 |

As is clear from Tables 1 and 2 above, the objective optical system of the present embodiment described above satisfies Conditions (1)-(6).

Figures 2A, 2B:
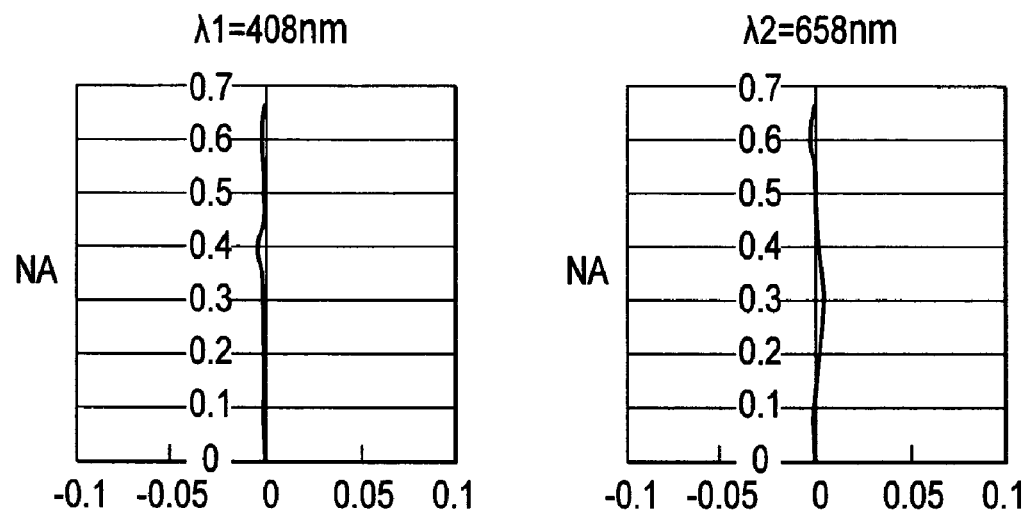
FIGS. 2A-2C illustrate wavefront aberration profiles of the light beams of three wavelengths that are focused to spots by the objective optical system of Embodiment 1 of the present invention, with FIG. 2A illustrating the wavefront aberration profile of the light beam of the first wavelength that is focused to a spot for the first optical recording medium, FIG. 2B illustrating the wavefront aberration profile of the light beam of the second wavelength that is focused to a spot for the second optical recording medium, and FIG. 2C illustrating the wavefront aberration profile of the light beam of the third wavelength that is focused to a spot for the third optical recording medium.
Figure 2C:
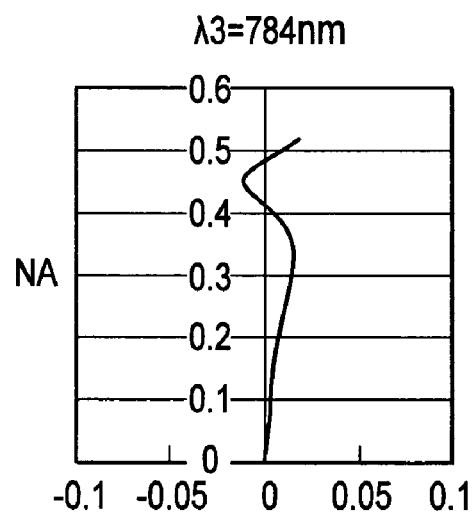

FIGS. 2A-2C illustrate wavefront aberration profiles of the light beams of three wavelengths being imaged to a spot by the objective optical system of Embodiment 1 of the present invention, with FIG. 2A illustrating the wavefront aberration profile of the light beam of the first wavelength being imaged to a spot for the first optical recording medium 9a, which is an AOD, FIG. 2B illustrating the wavefront aberration profile of the light beam of the second wavelength being imaged to a spot for the second optical recording medium 9b, which is a DVD, and FIG. 2C illustrating the wavefront aberration profile of the light beam of the third wavelength being imaged to a spot for the third optical recording medium 9c, which is a CD.

Embodiment 2

Figure 3A:
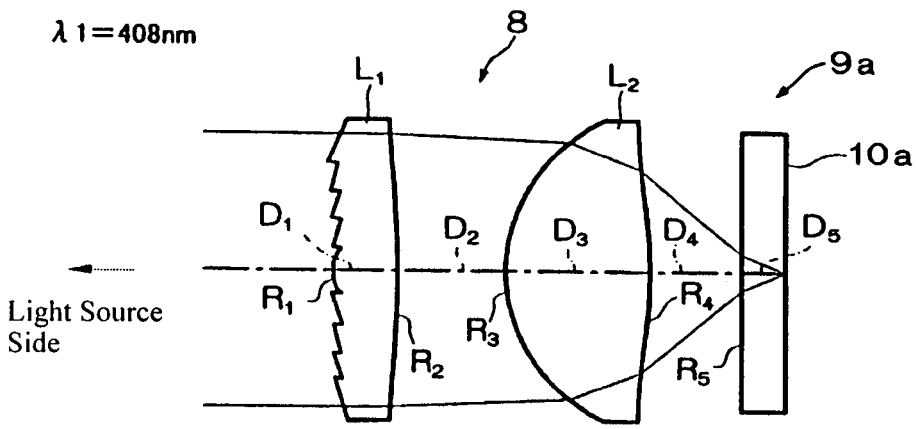
FIGS. 3A-3C are schematic diagrams that depict cross-sectional views of the objective optical system of Embodiment 2 of the present invention, with FIG. 3A showing the operation of the objective optical system when used with optical recording medium 9a, with FIG. 3B showing the operation of the objective optical system when used with a second optical recording medium 9b, and with FIG. 3C showing the operation of the objective optical system when used with a third optical recording medium 9c.
Figure 3B:
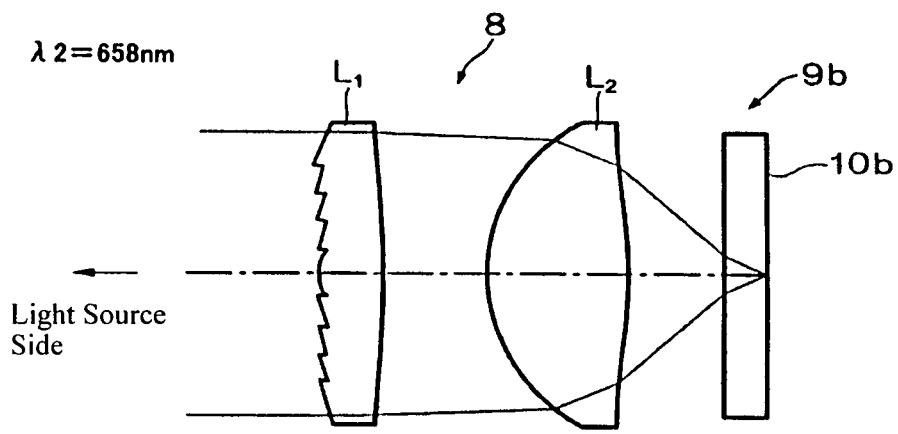
Figure 3C:
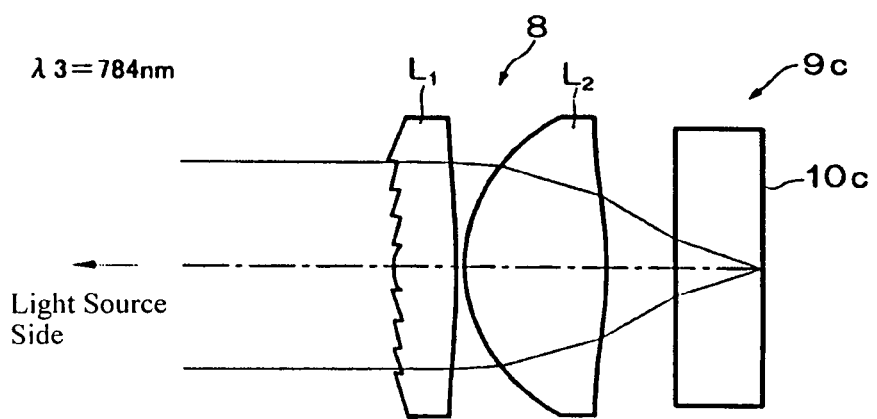

Embodiment 2 is similar to Embodiment 1 and is shown in FIGS. 3A-3C. Embodiment 2 differs from Embodiment 1 in its diffractive optical element in terms of the surface of the diffractive optical element on the objective lens side being convex rather than concave and in its phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, and different spacings between the objective lens and the three optical recording media.

In Embodiment 2 the following conditions are satisfied:

$\lambda 1 < \lambda 2 < \lambda 3$　　　　　　　　　　　　　　　Condition (1)

$NA1 \geqq NA2 > NA3$　　　　　　　　　　　　　Condition (2)

$T1 \leqq T2 < T3$　　　　　　　　　　　　　　　　Condition (3)

$d1 = d2$　　　　　　　　　　　　　　　　　　　Condition (6)

$d1 > d3$　　　　　　　　　　　　　　　　　　　Condition (7).

Table 5 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1=408$ nm for the AOD 9a, $\lambda 2=658$ nm for the DVD 9b, and $\lambda 3=784$ nm for the CD 9c), and the refractive indexes at the three used wavelengths.

TABLE 5

| # | Surface Type or Radius of Curvature | Surface Spacing | | | Refractive Index | | |
|---|---|---|---|---|---|---|---|
| | | λ1 = 408 nm | λ2 = 658 nm | λ3 = 784 nm | λ1 = 408 nm | λ2 = 658 nm | λ3 = 784 nm |
| 1 | diffractive | 0.700 | 0.700 | 0.700 | 1.55636 | 1.54076 | 1.53704 |
| 2 | aspheric | 1.500 | 1.500 | 0.100 | | | |
| 3 | aspheric | 2.000 | 2.000 | 2.000 | 1.55636 | 1.54076 | 1.53704 |
| 4 | aspheric | 1.248 | 1.330 | 0.974 | | | |
| 5 | ∞ | 0.600 | 0.600 | 1.200 | 1.62000 | 1.58000 | 1.57000 |
| 6 | ∞ | | | | | | |

Table 6 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 6

| | λ1 = 408 nm | λ2 = 658 nm | λ3 = 784 nm |
|---|---|---|---|
| diaphragm diameter | 3.9 | 4.0 | 3.0 |
| focal length, f | 3.00 | 3.08 | 2.89 |
| numerical aperture, NA | 0.65 | 0.65 | 0.51 |
| light source position | ∞ | ∞ | ∞ |
| diffraction order used | 2 | 1 | 1 |

Table 7 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 7 are zero.

TABLE 7

| | $2^{nd}$ Surface | $3^{rd}$ Surface | $4^{th}$ Surface |
|---|---|---|---|
| C | −7.3514084E−2 | 4.5527171E−1 | −1.5570411E−1 |
| K | 0.9999981 | 4.4737881E−2 | 5.0671370E−2 |
| $A_2$ | 2.3869426E−3 | 5.7100480E−3 | −2.4166107E−3 |
| $A_3$ | 3.0736142E−5 | −2.2783879E−4 | 8.3020386E−3 |
| $A_4$ | 4.7312925E−5 | 5.1487544E−4 | −1.8414183E−3 |
| $A_5$ | −7.4828573E−6 | −1.8116075E−5 | 1.2475544E−4 |

Table 8 below lists the values of the phase function coefficients $W_1$-$W_5$ of the 1st surface that forms the diffractive surface of the diffractive optical element $L_1$ of this embodiment. Phase function coefficients not listed in Table 8 are zero. An "E" in the data indicates that the number following the "E" is the exponent to the base 10. For example, "1.0E-2" represents the number $1.0 \times 10^{-2}$.

TABLE 8

| | |
|---|---|
| $W_1$ | −6.1809855E+1 |
| $W_2$ | −1.0677509 |
| $W_3$ | −3.3003964E−1 |
| $W_4$ | 6.0953485E−1 |
| $W_5$ | −6.7567329E−2 |

As is clear from Tables 5 and 6 above, the objective optical system of the present embodiment described above satisfies Conditions (1)-(3), (6), and (7).

Figure 4A:
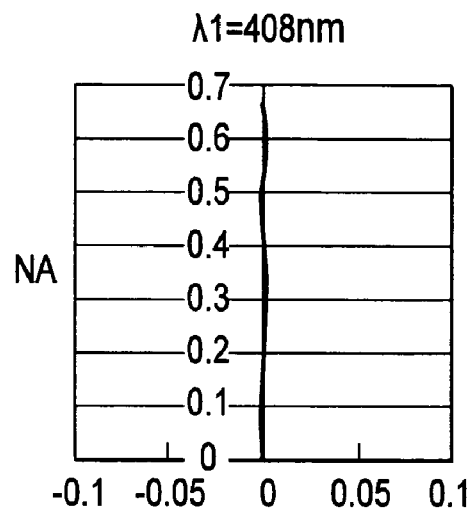
FIGS. 4A-4C illustrate wavefront aberration profiles of the light beams of three wavelengths that are focused to spots by the objective optical system of Embodiment 2 of the present invention, with FIG. 4A illustrating the wavefront aberration profile of the light beam of the first wavelength that is focused to a spot for the first optical recording medium, FIG. 4B illustrating the wavefront aberration profile of the light beam of the second wavelength that is focused to a spot for the second optical recording medium, and FIG. 4C illustrating the wavefront aberration profile of the light beam of the third wavelength that is focused to a spot for the third optical recording medium.
Figure 4B:
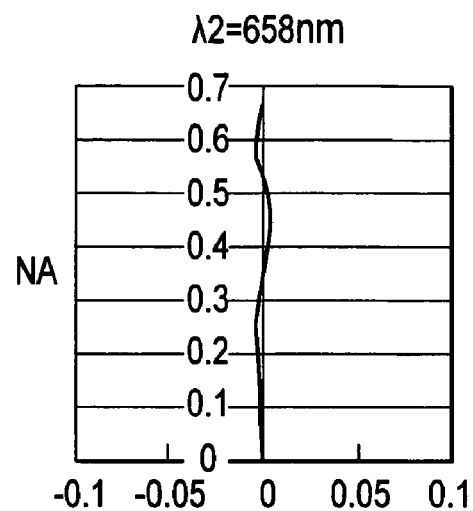
Figure 4C:
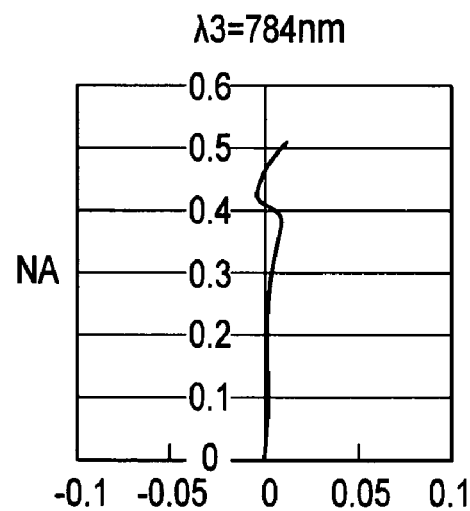

FIGS. 4A-4C illustrate wavefront aberration profiles of the light beams of three wavelengths being imaged to a spot by the objective optical system of Embodiment 2 of the present invention, with FIG. 4A illustrating the wavefront aberration profile of the light beam of the first wavelength being imaged to a spot for the first optical recording medium 9a, which is an AOD, FIG. 4B illustrating the wavefront aberration profile of the light beam of the second wavelength being imaged to a spot for the second optical recording medium 9b, which is a DVD, and FIG. 4C illustrating the wavefront aberration profile of the light beam of the third-wavelength being imaged to a spot for the third optical recording medium 9c, which is a CD.

Embodiment 3

Figure 5A:
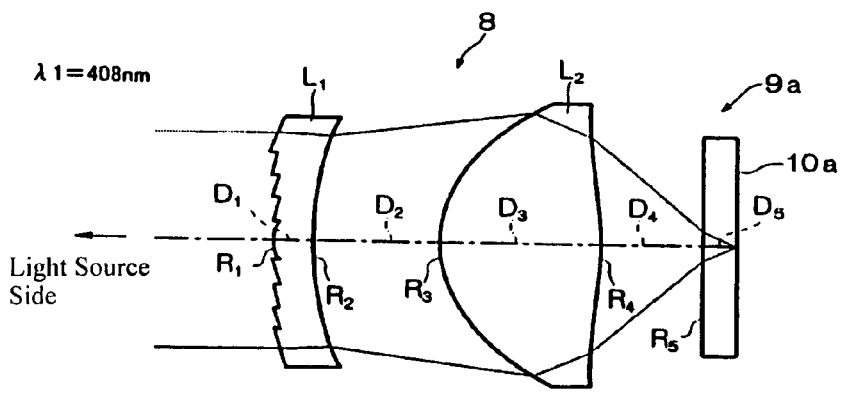
FIGS. 5A-5C are schematic diagrams that depict cross-sectional views of the objective optical system of Embodiment 3 of the present invention, with FIG. 5A showing the operation of the objective optical system when used with optical recording medium 9a, with FIG. 5B showing the operation of the objective optical system when used with a second optical recording medium 9b, and with FIG. 5C showing the operation of the objective optical system when used with a third optical recording medium 9c.
Figure 5B:
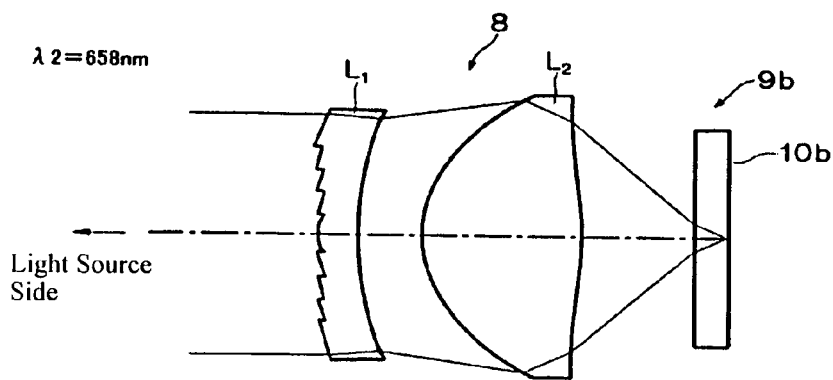
Figure 5C:
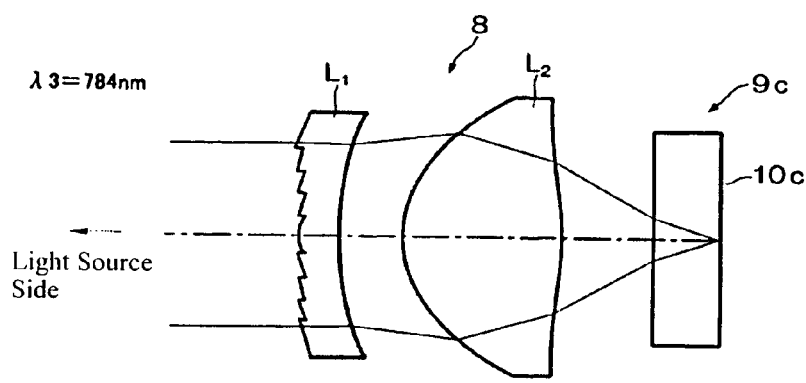

Embodiment 3 is similar to Embodiment 1 and is shown in FIGS. 5A-5C. Embodiment 3 differs from Embodiment 1 in its diffractive optical element in terms of different phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, and different spacings between the objective lens and the three optical recording media.

In Embodiment 3 the following conditions are satisfied:

λ1<λ2<λ3        Condition (1)

NA1≧NA2>NA3        Condition (2)

T1≦T2<T3        Condition (3)

d2=d3        Condition (8)

d2<d1        Condition (9).

Table 9 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths (λ1=408 nm for the AOD 9a, λ2=658 nm for the DVD 9b, and λ3=784 nm for the CD 9c), and the refractive indexes at the three used wavelengths.

TABLE 9

| # | Surface Type or Radius of Curvature | Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | diffractive | 0.500 | 0.500 | 0.500 | 1.55636 | 1.54076 | 1.53704 |
| 2 | aspheric | 2.261 | 1.152 | 1.152 | | | |
| 3 | aspheric | 2.906 | 2.906 | 2.906 | 1.55636 | 1.54076 | 1.53704 |
| 4 | aspheric | 1.822 | 1.987 | 1.624 | | | |
| 5 | ∞ | 0.600 | 0.600 | 1.200 | 1.62000 | 1.58000 | 1.57000 |
| 6 | ∞ | | | | | | |

Table 10 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 10

| | $\lambda 1 = 408$ nm | $\lambda 2 = 658$ nm | $\lambda 3 = 784$ nm |
|---|---|---|---|
| diaphragm diameter | 3.95 | 4.43 | 3.44 |
| focal length, f | 3.00 | 3.42 | 3.44 |
| numerical aperture, NA | 0.65 | 0.65 | 0.50 |
| light source position | ∞ | ∞ | ∞ |
| diffraction order used | 2 | 1 | 1 |

Table 11 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 11 are zero.

TABLE 11

| | 2$^{nd}$ Surface | 3$^{rd}$ Surface | 4$^{th}$ Surface |
|---|---|---|---|
| C | 1.5891241E-1 | 5.0755399E-1 | -2.0460219E-1 |
| K | 1.0055396 | -0.9288934 | -0.6604683 |
| $A_2$ | 2.0440713E-4 | 1.8156805E-2 | 2.1787363E-2 |
| $A_3$ | 5.1386804E-4 | -1.3723331E-3 | -2.0571974E-3 |
| $A_4$ | -2.7022002E-4 | 2.2261094E-4 | -5.6211898E-5 |
| $A_5$ | 4.5301607E-5 | -1.0787690E-5 | 1.7567040E-5 |

Table 12 below lists the values of the phase function coefficients $W_1$-$W_5$ of the 1st surface that forms the diffractive surface of the diffractive optical element $L_1$ of this embodiment. Phase function coefficients not listed in Table 12 are zero. An "E" in the data indicates that the number following the "E" is the exponent to the base 10. For example, "1.0E-2" represents the number $1.0 \times 10^{-2}$.

TABLE 12

| | |
|---|---|
| $W_1$ | -5.2991619E-1 |
| $W_2$ | -1.0140496E+1 |
| $W_3$ | -3.3844985 |
| $W_4$ | 1.2260449 |
| $W_5$ | -1.7564035E-1 |

As is clear from Tables 9 and 10 above, the objective optical system of the present embodiment described above satisfies Conditions (1)-(3), (8), and (9).

Figure 6A:
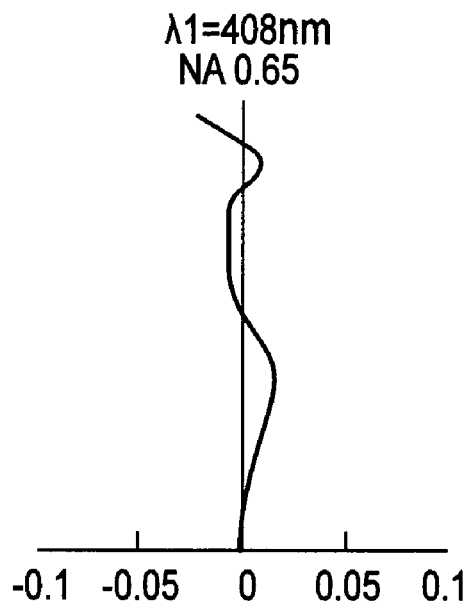
FIGS. 6A-6C illustrate wavefront aberration profiles of the light beams of three wavelengths that are focused to spots by the objective optical system of Embodiment 3 of the present invention, with FIG. 6A illustrating the wavefront aberration profile of the light beam of the first wavelength that is focused to a spot for the first optical recording medium, FIG. 6B illustrating the wavefront aberration profile of the light beam of the second wavelength that is focused to a spot for the second optical recording medium, and FIG. 6C illustrating the wavefront aberration profile of the light beam of the third wavelength that is focused to a spot for the third optical recording medium.
Figure 6B:
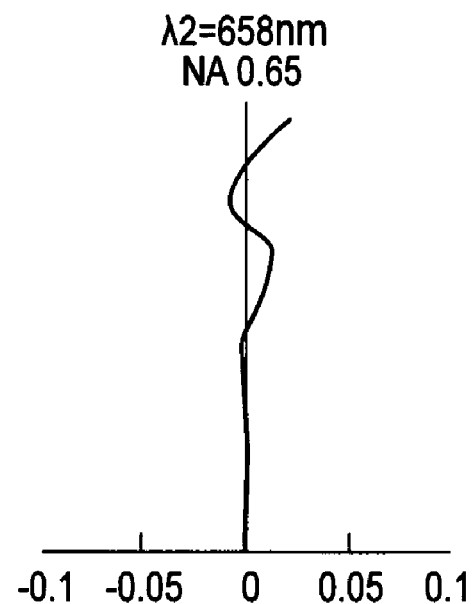
Figure 6C:
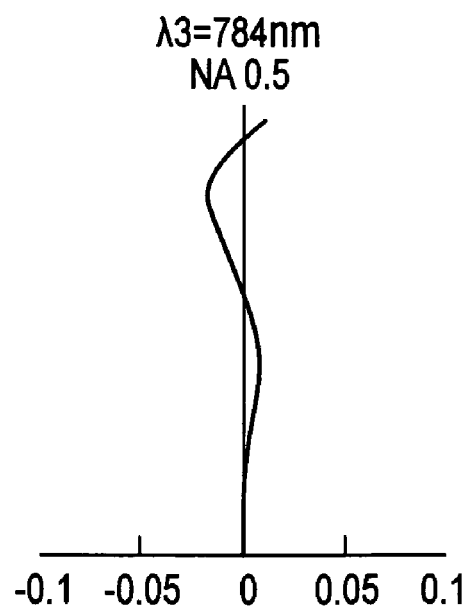

FIGS. 6A-6C illustrate wavefront aberration profiles of the light beams of three wavelengths being imaged to a spot by the objective optical system of Embodiment 3 of the present invention, with FIG. 6A illustrating the wavefront aberration profile of the light beam of the first wavelength being imaged to a spot for the first optical recording medium 9a, which is an AOD, FIG. 6B illustrating the wavefront aberration profile of the light beam of the second wavelength being imaged to a spot for the second optical recording medium 9b, which is a DVD, and FIG. 6C illustrating the wavefront aberration profile of the light beam of the third wavelength being imaged to a spot for the third optical recording medium 9c, which is a CD.

Embodiment 4

Figure 7A:
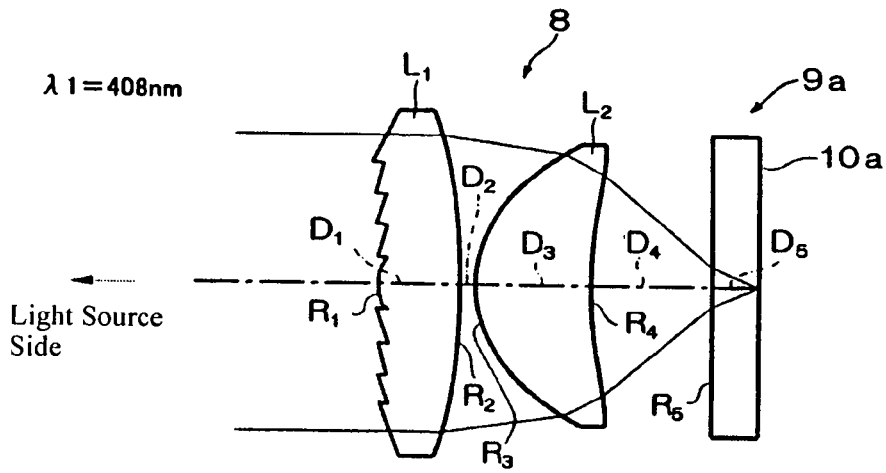
FIGS. 7A-7C are schematic diagrams that depict cross-sectional views of the objective optical system of Embodiment 4 of the present invention, with FIG. 7A showing the operation of the objective optical system when used with optical recording medium 9a, with FIG. 7B showing the operation of the objective optical system when used with a second optical recording medium 9b, and with FIG. 7C showing the operation of the objective optical system when used with a third optical recording medium 9c.
Figure 7B:
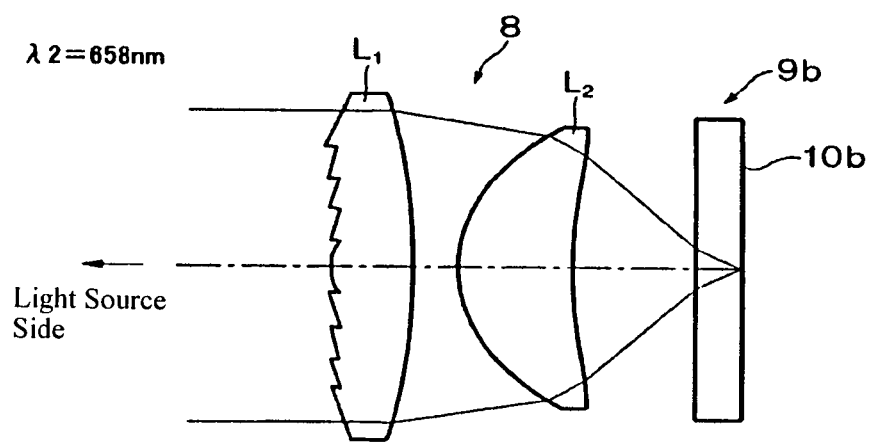
Figure 7C:
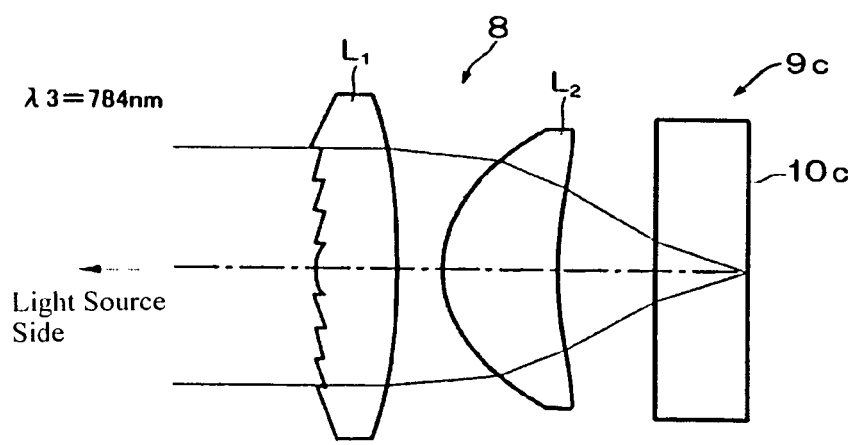

Embodiment 4 is similar to Embodiment 1 and is shown in FIGS. 7A-7C. Embodiment 4 differs from Embodiment 1 in its diffractive optical element in terms of the surface of the diffractive optical element on the objective lens side being convex rather than concave and in its phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, different spacings between the objective lens and the three optical recording media, and the recording medium side of the objective lens being concave rather than convex.

In Embodiment 4 the following conditions are satisfied:

$\lambda 1 < \lambda 2 < \lambda 3$   Condition (1)

$NA1 \geq NA2 > NA3$   Condition (2)

$T1 \leq T2 < T3$   Condition (3)

$d2 = d3$   Condition (8)

$d2 > d1$   Condition (10).

Table 13 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1$=408 nm for the AOD 9a, $\lambda 2$=658 nm for the DVD 9b, and $\lambda 3$=784 nm for the CD 9c), and the refractive indexes at the three used wavelengths.

TABLE 13

| # | Surface Type or Radius of Curvature | Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | diffractive | 0.800 | 0.800 | 0.800 | 1.55636 | 1.54076 | 1.53704 |
| 2 | aspheric | 0.200 | 0.592 | 0.592 | | | |
| 3 | aspheric | 1.506 | 1.506 | 1.506 | 1.55636 | 1.54076 | 1.53704 |
| 4 | aspheric | 1.566 | 1.595 | 1.269 | | | |
| 5 | ∞ | 0.600 | 0.600 | 1.200 | 1.62000 | 1.58000 | 1.57000 |
| 6 | ∞ | | | | | | |

Table 14 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 14

| | $\lambda 1 = 408$ nm | $\lambda 2 = 658$ nm | $\lambda 3 = 784$ nm |
|---|---|---|---|
| diaphragm diameter | 3.92 | 4.12 | 3.15 |
| focal length, f | 3.02 | 3.11 | 3.16 |
| numerical aperture, NA | 0.65 | 0.65 | 0.50 |
| light source position | ∞ | ∞ | ∞ |
| diffraction order used | 2 | 1 | 1 |

Table 15 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 15 are zero.

TABLE 15

| | $2^{nd}$ Surface | $3^{rd}$ Surface | $4^{th}$ Surface |
|---|---|---|---|
| C | −8.2299056E−2 | 6.3930740E−1 | 1.3922629E−1 |
| K | 1.0000000 | −0.3766469 | −0.4411453 |
| $A_2$ | −8.7671702E−3 | 2.7851097E−2 | 3.8568841E−2 |
| $A_3$ | 1.8704384E−3 | 1.0676547E−3 | −3.1137839E−2 |
| $A_4$ | −2.2665527E−4 | 4.6894828E−4 | 8.8198958E−3 |
| $A_5$ | 6.7666597E−6 | −1.5177232E−4 | −9.7772142E−4 |

Table 16 below lists the values of the phase function coefficients $W_1$-$W_5$ of the 1st surface that forms the diffractive surface of the diffractive optical element $L_1$ of this embodiment. Phase function coefficients not listed in Table 16 are zero. An "E" in the data indicates that the number following the "E" is the exponent to the base 10. For example, "1.0E-2" represents the number $1.0 \times 10^{-2}$.

TABLE 16

| | |
|---|---|
| $W_1$ | 9.5171939E+1 |
| $W_2$ | −9.9323572 |
| $W_3$ | −2.0746290 |
| $W_4$ | 3.0498498E−1 |
| $W_5$ | 2.8966324E−2 |

As is clear from Tables 13 and 14 above, the objective optical system of the present embodiment described above satisfies Conditions (1)-(3), (8), and (10).

Figure 8A:
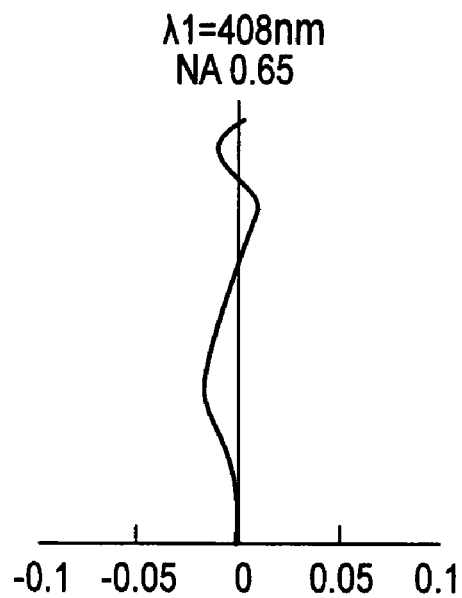
FIGS. 8A-8C illustrate wavefront aberration profiles of the light beams of three wavelengths that are focused to spots by the objective optical system of Embodiment 4 of the present invention, with FIG. 8A illustrating the wavefront aberration profile of the light beam of the first wavelength that is focused to a spot for the first optical recording medium, FIG. 8B illustrating the wavefront aberration profile of the light beam of the second wavelength that is focused to a spot for the second optical recording medium, and FIG. 8C illustrating the wavefront aberration profile of the light beam of the third wavelength that is focused to a spot for the third optical recording medium.
Figure 8B:
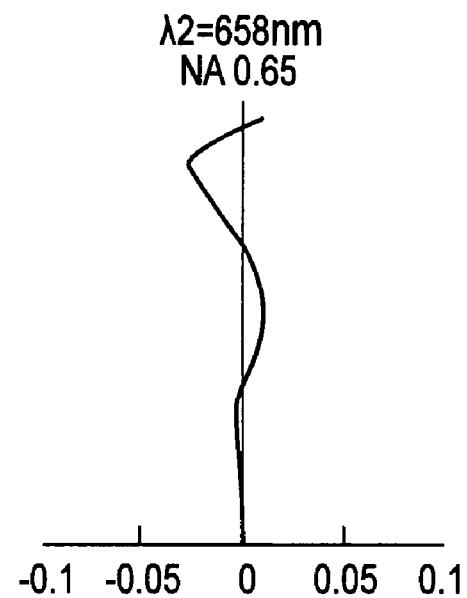
Figure 8C:
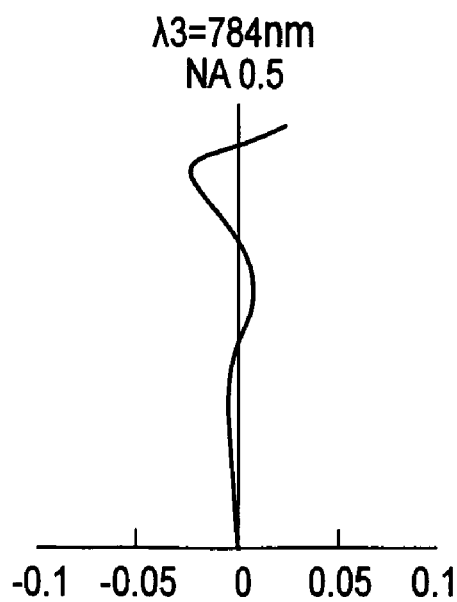

FIGS. 8A-8C illustrate wavefront aberration profiles of the light beams of three wavelengths being imaged to a spot by the objective optical system of Embodiment 4 of the present invention, with FIG. 8A illustrating the wavefront aberration profile of the light beam of the first wavelength being imaged to a spot for the first optical recording medium 9a, which is an AOD, FIG. 8B illustrating the wavefront aberration profile of the light beam of the second wavelength being imaged to a spot for the second optical recording medium 9b, which is a DVD, and FIG. 8C illustrating the wavefront aberration profile of the light beam of the third wavelength being imaged to a spot for the third optical recording medium 9c, which is a CD.

Embodiment 5

Figure 9A:
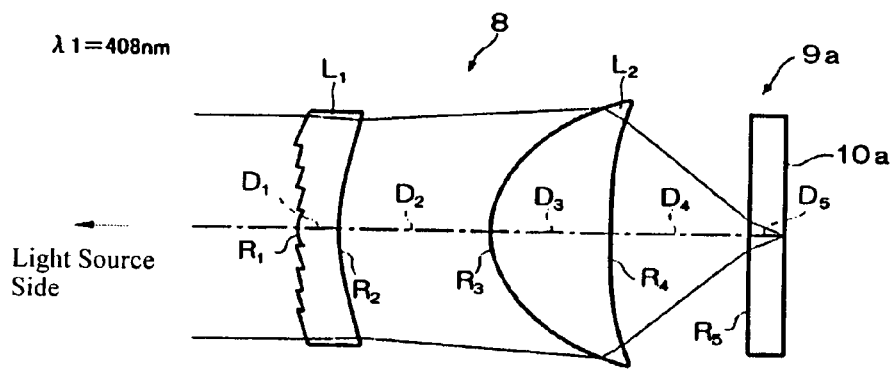
FIGS. 9A-9C are schematic diagrams that depict cross-sectional views of the objective optical system of Embodiment 5 of the present invention, with FIG. 9A showing the operation of the objective optical system when used with optical recording medium 9a, with FIG. 9B showing the operation of the objective optical system when used with a second optical recording medium 9b, and with FIG. 9C showing the operation of the objective optical system when used with a third optical recording medium 9c.
Figure 9B:
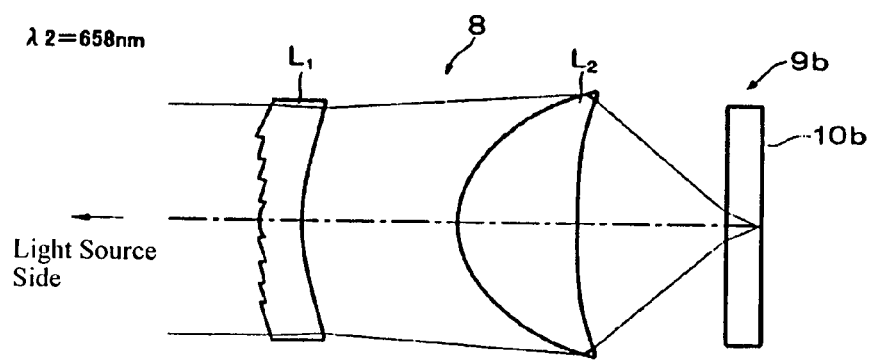
Figure 9C:
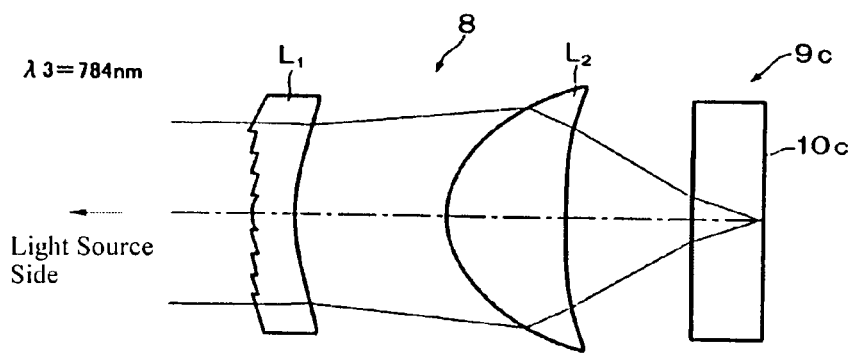

Embodiment 5 is similar to Embodiment 1 and is shown in FIGS. 9A-9C. Embodiment 5 differs from Embodiment 1 in its diffractive optical element in terms of its phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, different spacings between the objective lens and the three optical recording media, and the recording medium side of the objective lens being concave instead of convex. Also, the refractive indexes of the recording media substrates are different from in Embodiment 1.

In Embodiment 5 the following conditions are satisfied:

$\lambda 1 < \lambda 2 < \lambda 3$      Condition (1)

$NA1 \geq NA2 > NA3$      Condition (2)

$T1 \leq T2 < T3$      Condition (3)

$d3 = d1$      Condition (11)

$d3 < d2$      Condition (12)

Table 17 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1$=408 nm for the AOD 9a, $\lambda 2$=658 nm for the DVD 9b, and $\lambda 3$=784 nm for the CD 9c), and the refractive indexes at the three used wavelengths.

TABLE 17

| # | Surface Type or Radius of Curvature | Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | diffractive | 0.500 | 0.500 | 0.500 | 1.55636 | 1.54076 | 1.53704 |
| 2 | aspheric | 2.600 | 2.672 | 2.600 | | | |
| 3 | aspheric | 2.064 | 2.064 | 2.064 | 1.55636 | 1.54076 | 1.53704 |
| 4 | aspheric | 2.353 | 2.480 | 2.110 | | | |
| 5 | ∞ | 0.600 | 0.600 | 1.200 | 1.61800 | 1.57800 | 1.57200 |
| 6 | ∞ | | | | | | |

Table 18 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 18

| | $\lambda 1 = 408$ nm | $\lambda 2 = 658$ nm | $\lambda 3 = 784$ nm |
|---|---|---|---|
| diaphragm diameter | 3.91 | 4.02 | 3.22 |
| focal length, f | 3.00 | 3.09 | 3.16 |
| numerical aperture, NA | 0.65 | 0.65 | 0.51 |
| light source position | ∞ | ∞ | ∞ |
| diffraction order used | 2 | 1 | 1 |

Table 19 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 19 are zero.

TABLE 19

| | $2^{nd}$ Surface | $3^{rd}$ Surface | $4^{th}$ Surface |
|---|---|---|---|
| C | 2.926350475E-1 | 6.417242014E-1 | 2.337704093E-2 |
| K | 1.457177048 | 3.787841383E-1 | -4.305227135E-2 |
| $A_2$ | -2.263247722E-2 | -7.610642022E-3 | 1.521652426E-2 |
| $A_3$ | 3.760047725E-4 | 3.392926060E-4 | -2.365496790E-4 |
| $A_4$ | 5.642858670E-4 | -2.596871334E-5 | -2.716720743E-4 |
| $A_5$ | -1.023179106E-4, | 8.366733126E-6 | 2.441624926E-5 |

Table 20 below lists the values of the phase function coefficients $W_1$-$W_5$ of the 1st surface that forms the diffractive surface of the diffractive optical element $L_1$ of this embodiment. Phase function coefficients not listed in Table 20 are zero. An "E" in the data indicates that the number following the "E" is the exponent to the base 10. For example, "1.0E-2" represents the number $1.0 \times 10^{-2}$.

TABLE 20

| | |
|---|---|
| $W_1$ | -7.550971093E+1 |
| $W_2$ | 1.443491967 |
| $W_3$ | 2.136461528E-1 |
| $W_4$ | -1.833553883 |
| $W_5$ | 2.959801263E-1 |

As is clear from Tables 17 and 18 above, the objective optical system of the present embodiment described above satisfies Conditions (1)-(3), (11) and (12).

Figure 10A:
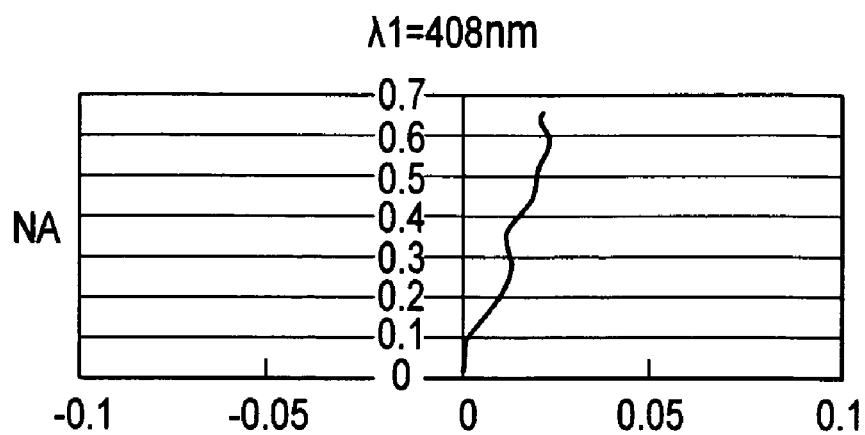
FIGS. 10A-10C illustrate wavefront aberration profiles of the light beams of three wavelengths that are focused to spots by the objective optical system of Embodiment 5 of the present invention, with FIG. 10A illustrating the wavefront aberration profile of the light beam of the first wavelength that is focused to a spot for the first optical recording medium, FIG. 10B illustrating the wavefront aberration profile of the light beam of the second wavelength that is focused to a spot for the second optical recording medium, and FIG. 10C illustrating the wavefront aberration profile of the light beam of the third wavelength that is focused to a spot for the third optical recording medium.
Figure 10B:
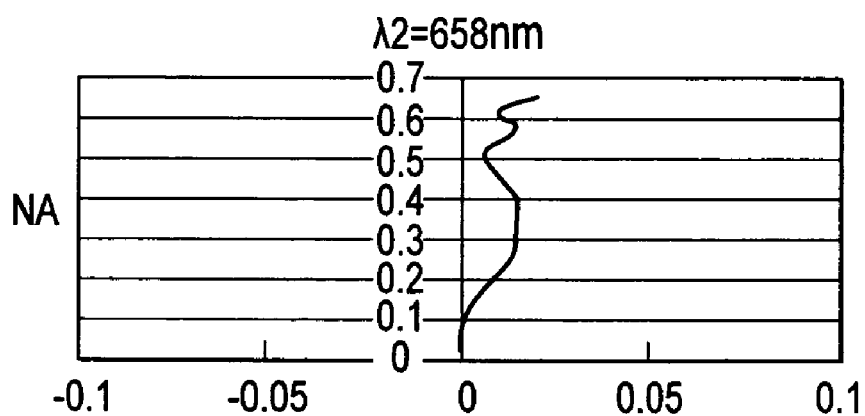
Figure 10C:
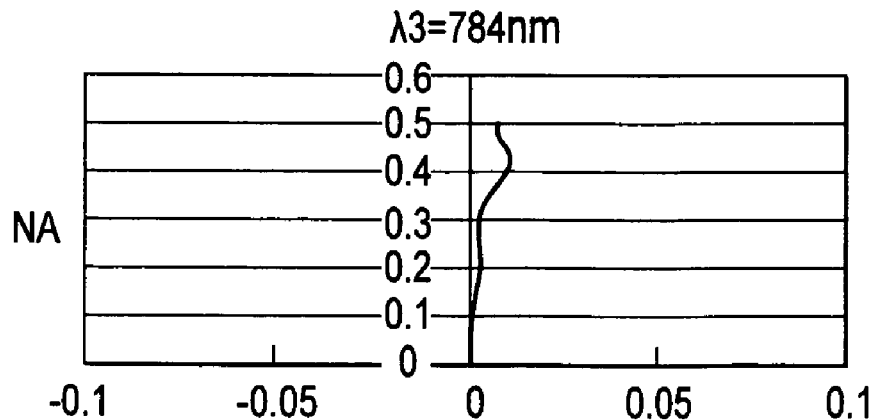

FIGS. 10A-10C illustrate wavefront aberration profiles of the light beams of three wavelengths being imaged to a spot by the objective optical system of Embodiment 5 of the present invention, with FIG. 10A illustrating the wavefront aberration profile of the light beam of the first wavelength being imaged to a spot for the first optical recording medium 9a, which is an AOD, FIG. 10B illustrating the wavefront aberration profile of the light beam of the second wavelength being imaged to a spot for the second optical recording medium 9b, which is a DVD, and FIG. 10C illustrating the wavefront aberration profile of the light beam of the third wavelength being imaged to a spot for the third optical recording medium 9c, which is a CD.

Embodiment 6

Figure 11A:
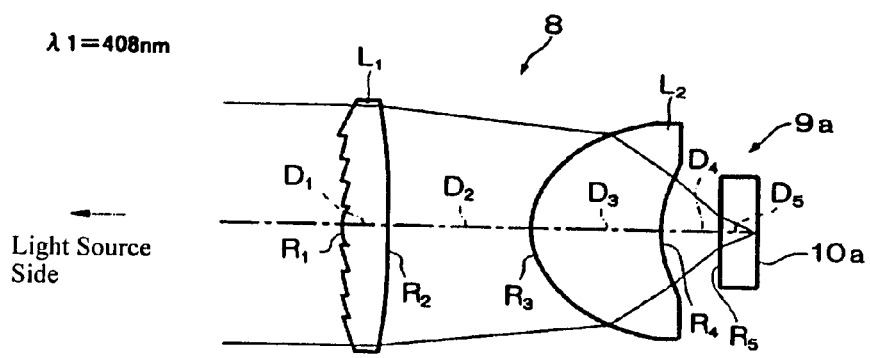
FIGS. 11A-11C are schematic diagrams that depict cross-sectional views of the objective optical system of Embodiment 6 of the present invention, with FIG. 11A showing the operation of the objective optical system when used with optical recording medium 9a, with FIG. 11B showing the operation of the objective optical system when used with a second optical recording medium 9b, and with FIG. 11C showing the operation of the objective optical system when used with a third optical recording medium 9c.
Figure 11B:
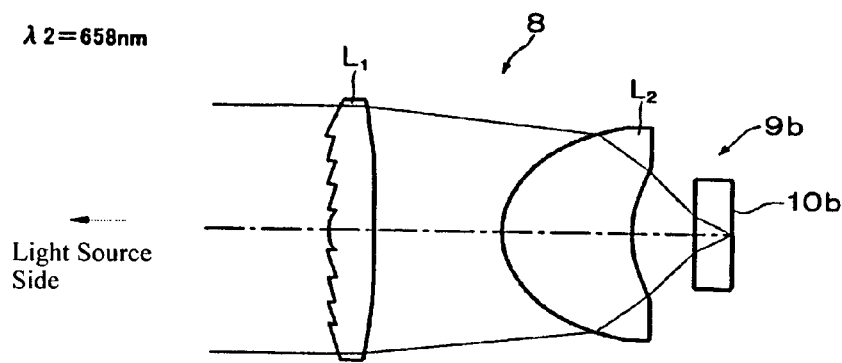
Figure 11C:
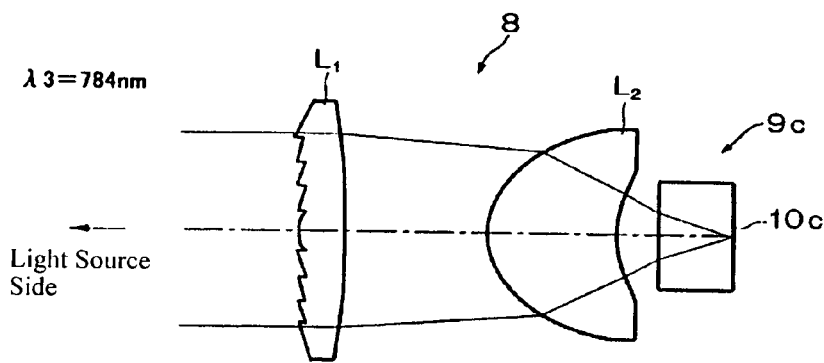

Embodiment 6 is similar to Embodiment 1 and is shown in FIGS. 11A-11C. Embodiment 6 differs from Embodiment 1 in its diffractive optical element in terms of the surface of the diffractive optical element on the objective lens side being convex rather than concave and in its phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, different spacings between the objective lens and the three optical recording media, and the recording medium side of the objective lens being concave instead of convex. Also, the refractive indexes of the recording media substrates are different from in Embodiment 1.

In Embodiment 6 the following conditions are satisfied:

$\lambda 1 < \lambda 2 < \lambda 3$      Condition (1)

NA1≧NA2>NA3      Condition (2)

T1≦T2<T3      Condition (3)

d3=d1      Condition (11)

d2<d3      Condition (5).

Table 21 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1$=408 nm for the AOD 9a, $\lambda 2$=658 nm for the DVD 9b, and $\lambda 3$=784 nm for the CD 9c), and the refractive indexes at the three used wavelengths.

TABLE 21

| # | Surface Type or Radius of Curvature | Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | diffractive | 0.500 | 0.500 | 0.500 | 1.55636 | 1.54076 | 1.53704 |
| 2 | aspheric | 2.280 | 2.040 | 2.280 | | | |
| 3 | aspheric | 2.060 | 2.060 | 2.060 | 1.55636 | 1.54076 | 1.53704 |
| 4 | aspheric | 0.952 | 1.009 | 0.668 | | | |
| 5 | ∞ | 0.600 | 0.600 | 1.200 | 1.61800 | 1.57800 | 1.57200 |
| 6 | ∞ | | | | | | |

Table 22 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 22

| | $\lambda 1 = 408$ nm | $\lambda 2 = 658$ nm | $\lambda 3 = 784$ nm |
|---|---|---|---|
| diaphragm diameter | 3.91 | 4.07 | 3.22 |
| focal length, f | 3.01 | 3.13 | 3.16 |
| numerical aperture, NA | 0.65 | 0.65 | 0.51 |
| light source position | ∞ | ∞ | ∞ |
| diffraction order used | 2 | 1 | 1 |

Table 23 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 23 are zero.

TABLE 23

| | $2^{nd}$ Surface | $3^{rd}$ Surface | $4^{th}$ Surface |
|---|---|---|---|
| C | 1.471168116E-2 | 8.277946168E-1 | 5.344907618E-1 |
| K | 1.442611840 | 4.135376067E-1 | 9.872534643E-2 |
| $A_2$ | -2.086596780E-2 | -9.925211511E-3 | 1.195081883E-1 |
| $A_3$ | 4.758661724E-4 | 1.561744939E-3 | -1.727795583E-1 |
| $A_4$ | 1.163551466E-3 | -1.668412352E-3 | 4.798252365E-2 |
| $A_5$ | -1.528468107E-4 | 1.174110617E-3 | 2.494014457E-3 |

Table 24 below lists the values of the phase function coefficients $W_1$-$W_5$ of the 1st surface that forms the diffractive surface of the diffractive optical element $L_1$ of this embodiment. Phase function coefficients not listed in Table 24 are zero. An "E" in the data indicates that the number following the "E" is the exponent to the base 10. For example, "1.0E-2" represents the number $1.0 \times 10^{-2}$.

TABLE 24

| | |
|---|---|
| $W_1$ | 5.191548739E+1 |
| $W_2$ | -2.514774436E+1 |
| $W_3$ | 1.968327546E+1 |
| $W_4$ | -6.640580014 |
| $W_5$ | 6.530808072E-1 |

As is clear from Tables 21 and 22 above, the objective optical system of the present embodiment described above satisfies Conditions (1)-(3), (5), and (11).

Figure 12A:
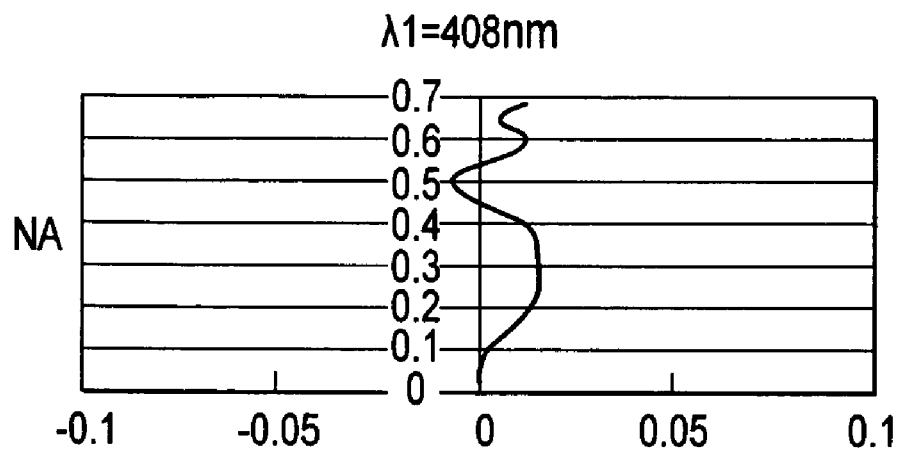
FIGS. 12A-12C illustrate wavefront aberration profiles of the light beams of three wavelengths that are focused to spots by the objective optical system of Embodiment 6 of the present invention, with FIG. 12A illustrating the wavefront aberration profile of the light beam of the first wavelength that is focused to a spot for the first optical recording medium, FIG. 12B illustrating the wavefront aberration profile of the light beam of the second wavelength that is focused to a spot for the second optical recording medium, and FIG. 12C illustrating the wavefront aberration profile of the light beam of the third wavelength that is focused to a spot for the third optical recording medium.
Figure 12B:
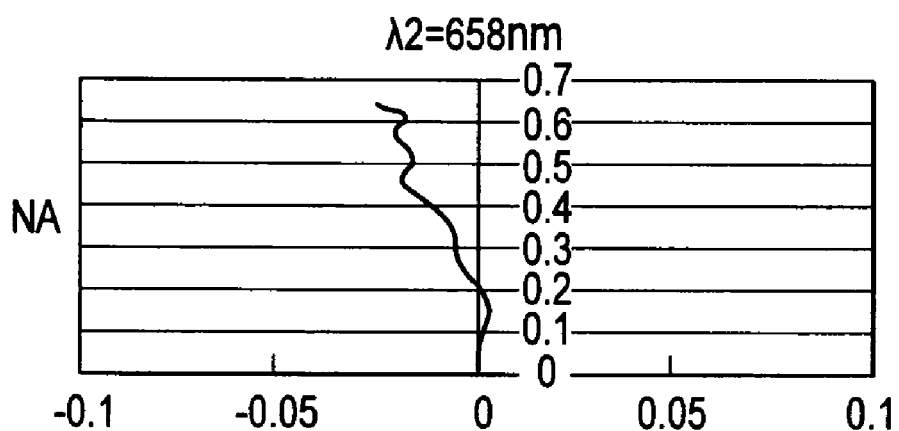
Figure 12C:
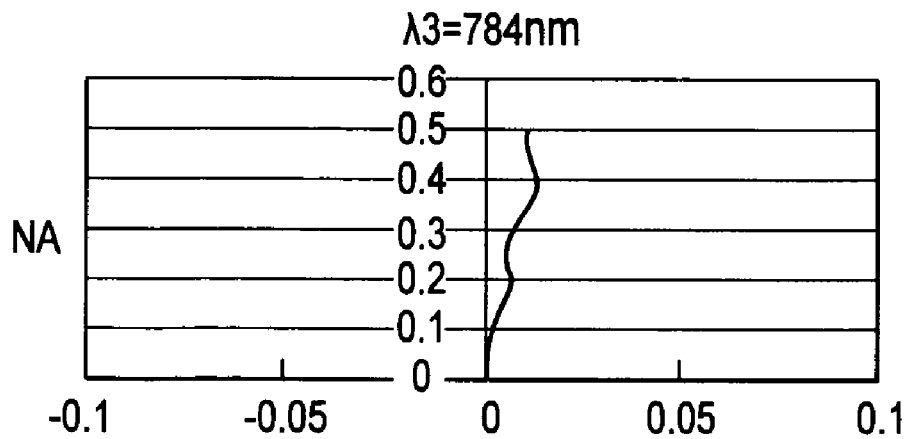

FIGS. 12A-12C illustrate wavefront aberration profiles of the light beams of three wavelengths being imaged to a spot by the objective optical system of Embodiment 6 of the present invention, with FIG. 12A illustrating the wavefront aberration profile of the light beam of the first wavelength being imaged to a spot for the first optical recording medium 9a, which is an AOD, FIG. 12B illustrating the wavefront aberration profile of the light beam of the second wavelength being imaged to a spot for the second optical recording medium 9b, which is a DVD, and FIG. 12C illustrating the wavefront aberration profile of the light beam of the third wavelength being imaged to a spot for the third optical recording medium 9c, which is a CD.

Embodiment 7

Figure 13A:
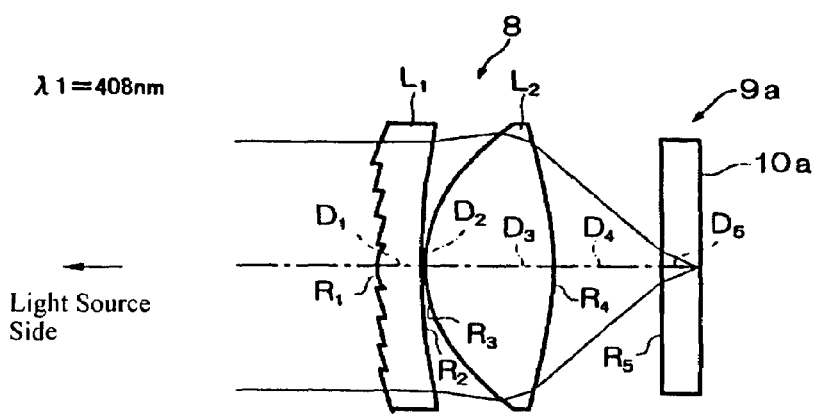
FIGS. 13A-13C are schematic diagrams that depict cross-sectional views of the objective optical system of Embodiment 7 of the present invention, with FIG. 13A showing the operation of the objective optical system when used with optical recording medium 9a, with FIG. 13B showing the operation of the objective optical system when used with a second optical recording medium 9b, and with FIG. 13C showing the operation of the objective optical system when used with a third optical recording medium 9c.
Figure 13B:
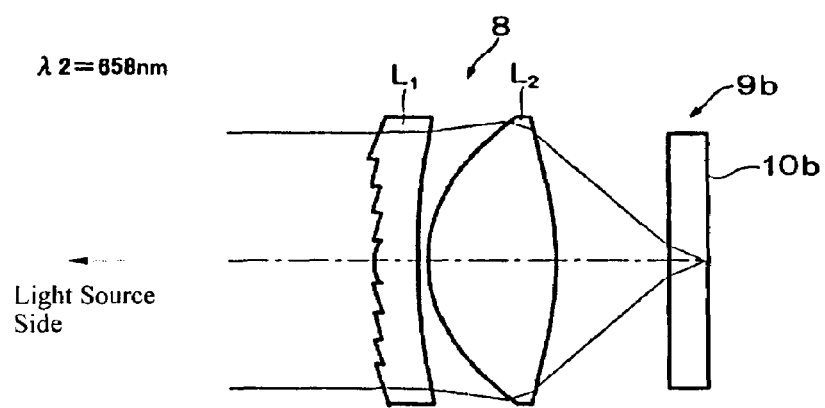
Figure 13C:
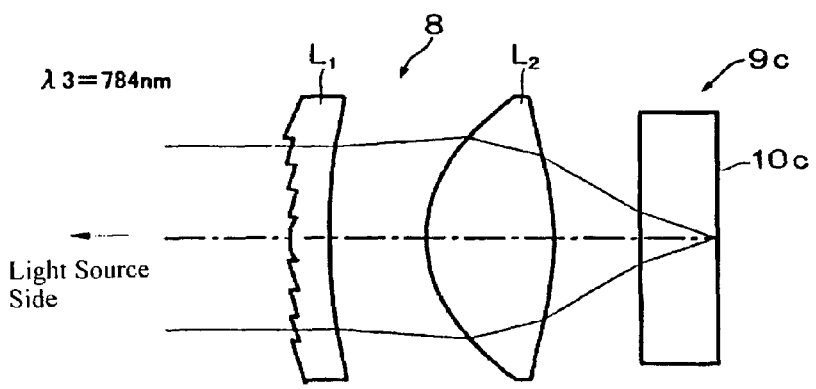

Embodiment 7 is similar to Embodiment 1 and is shown in FIGS. 13A-13C. Embodiment 7 differs from Embodiment 1 in its diffractive optical element in its phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, and different spacings between the objective lens and the three optical recording media.

In Embodiment 7 the following conditions are satisfied:

λ1<λ2<λ3                    Condition (1)

NA1≧NA2>NA3                  Condition (2)

T1≦T2<T3                     Condition (3)

d1<d2<d3                     Condition (13).

Table 25 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths (λ1=408 nm for the AOD 9a, λ2=658 nm for the DVD 9b, and λ3=784 nm for the CD 9c), and the refractive indexes at the three used wavelengths.

TABLE 25

| # | Surface Type or Radius of Curvature | Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | diffractive | 0.500 | 0.500 | 0.500 | 1.55636 | 1.54076 | 1.53704 |
| 2 | aspheric | 0.050 | 0.150 | 1.500 | | | |
| 3 | aspheric | 2.000 | 2.000 | 2.000 | 1.55636 | 1.54076 | 1.53704 |
| 4 | aspheric | 1.665 | 1.756 | 1.358 | | | |
| 5 | ∞ | 0.600 | 0.600 | 1.200 | 1.62000 | 1.58000 | 1.57000 |
| 6 | ∞ | | | | | | |

Table 26 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 26

| | $\lambda 1 = 408$ nm | $\lambda 2 = 658$ nm | $\lambda 3 = 784$ nm |
|---|---|---|---|
| diaphragm diameter | 3.9 | 4.0 | 2.9 |
| focal length, f | 3.00 | 3.09 | 3.02 |
| numerical aperture, NA | 0.65 | 0.65 | 0.51 |
| light source position | ∞ | ∞ | ∞ |
| diffraction order used | 2 | 1 | 1 |

Table 27 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 27 are zero.

TABLE 27

| | $2^{nd}$ Surface | $3^{rd}$ Surface | $4^{th}$ Surface |
|---|---|---|---|
| C | 6.4122954E-2 | 4.7690629E-1 | -2.3022646E-1 |
| K | 0.9999997 | 4.4737881E-2 | 5.0665251E-2 |
| $A_2$ | 7.6735629E-3 | 8.9969198E-3 | 1.1576019E-2 |
| $A_3$ | -1.0129841E-3 | -7.5489537E-4 | -1.0843549E-3 |
| $A_4$ | 2.0973138E-4 | 1.1193496E-4 | 6.4033046E-5 |
| $A_5$ | -3.9074618E-5 | -1.2778583E-5 | -1.9635016E-6 |

Table 28 below lists the values of the phase function coefficients $W_1$-$W_5$ of the 1st surface that forms the diffractive surface of the diffractive optical element $L_1$ of this embodiment. Phase function coefficients not listed in Table 28 are zero. An "E" in the data indicates that the number following the "E" is the exponent to the base 10. For example, "1.0E-2" represents the number $1.0 \times 10^{-2}$.

TABLE 28

| | |
|---|---|
| $W_1$ | -6.8659265E+1 |
| $W_2$ | 4.3432274E-1 |
| $W_3$ | 1.7544599 |
| $W_4$ | -2.7992684E-1 |
| $W_5$ | 9.2146214E-2 |

As is clear from Tables 25 and 26 above, the objective optical system of the present embodiment described above satisfies Conditions (1)-(3) and (13).

Figures 14A, 14B:
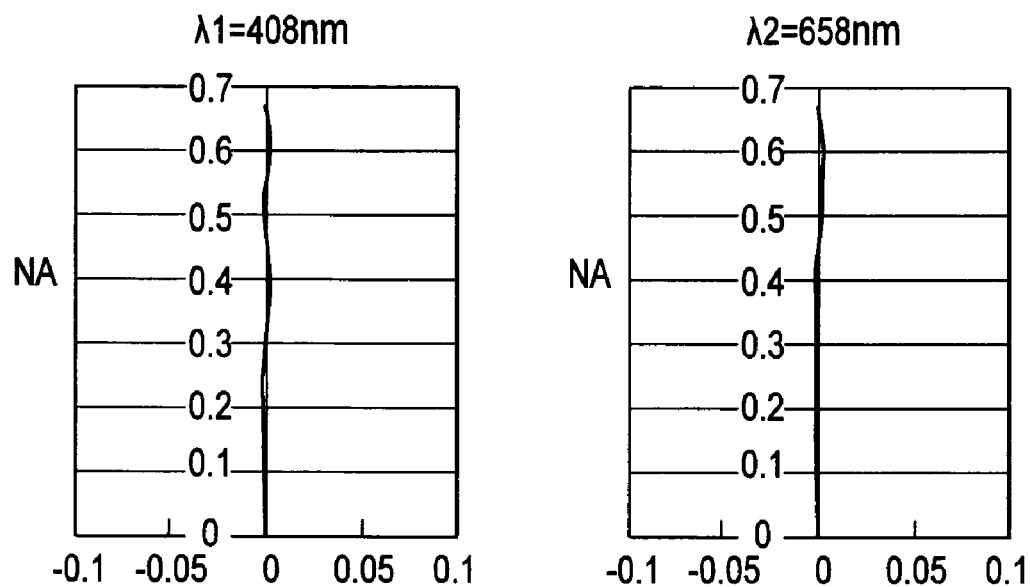
FIGS. 14A-14C illustrate wavefront aberration profiles of the light beams of three wavelengths that are focused to spots by the objective optical system of Embodiment 7 of the present invention, with FIG. 14A illustrating the wavefront aberration profile of the light beam of the first wavelength that is focused to a spot for the first optical recording medium, FIG. 14B illustrating the wavefront aberration profile of the light beam of the second wavelength that is focused to a spot for the second optical recording medium, and FIG. 14C illustrating the wavefront aberration profile of the light beam of the third wavelength that is focused to a spot for the third optical recording medium.
Figure 14C:
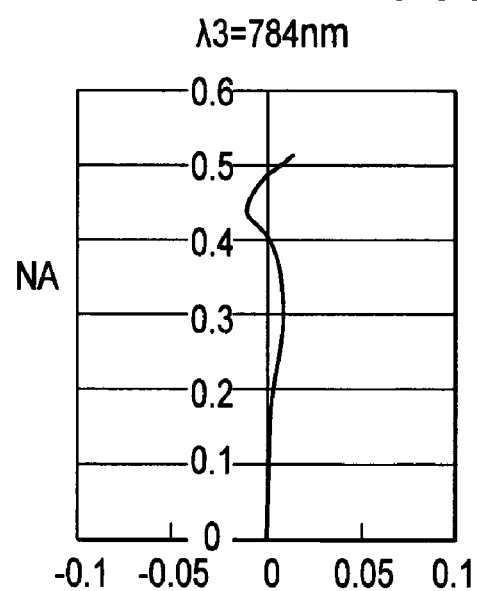

FIGS. 14A-14C illustrate wavefront aberration profiles of the light beams of three wavelengths being imaged to a spot by the objective optical system of Embodiment 7 of the present invention, with FIG. 14A illustrating the wavefront aberration profile of the light beam of the first wavelength being imaged to a spot for the first optical recording medium 9a, which is an AOD, FIG. 14B illustrating the wavefront aberration profile of the light beam of the second wavelength being imaged to a spot for the second optical recording medium 9b, which is a DVD, and FIG. 14C illustrating the wavefront aberration profile of the light beam of the third wavelength being imaged to a spot for the third optical recording medium 9c, which is a CD.

Embodiment 8

Figure 15A:
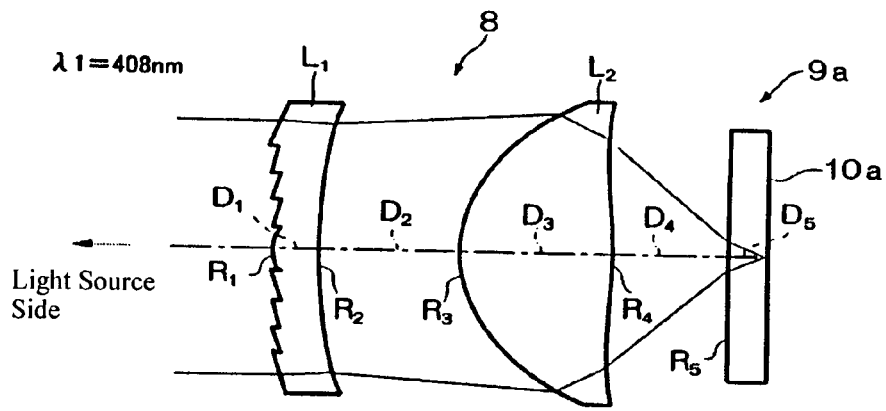
FIGS. 15A-15C are schematic diagrams that depict cross-sectional views of the objective optical system of Embodiment 8 of the present invention, with FIG. 15A showing the operation of the objective optical system when used with optical recording medium 9a, with FIG. 15B showing the operation of the objective optical system when used with a second optical recording medium 9b, and with FIG. 15C showing the operation of the objective optical system when used with a third optical recording medium 9c.
Figure 15B:
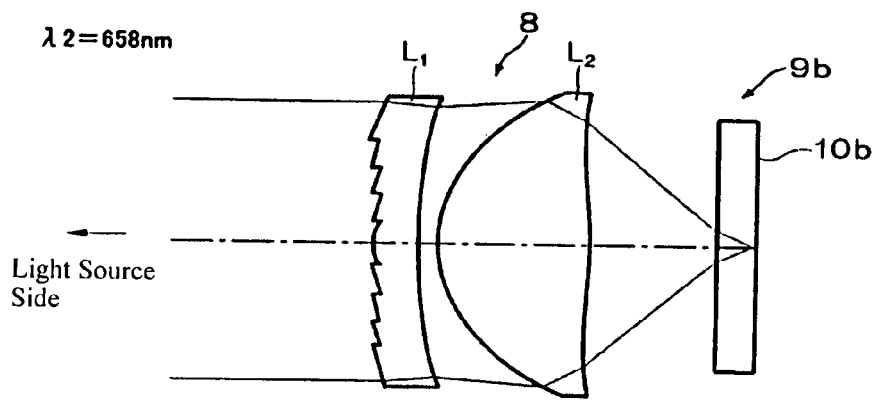
Figure 15C:
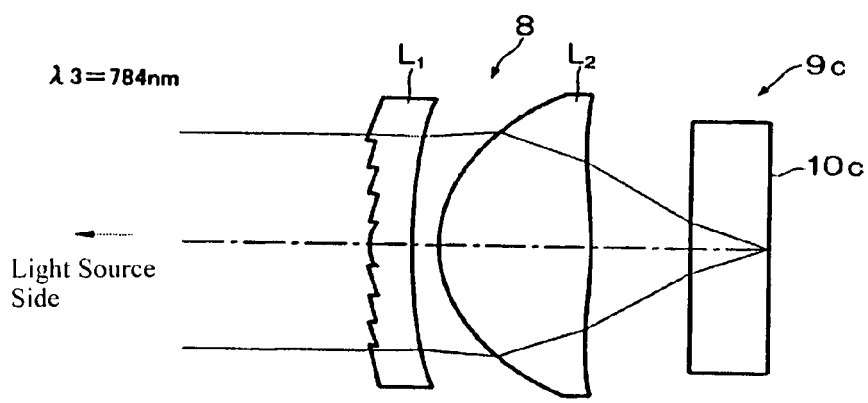

Embodiment 8 is similar to Embodiment 1 and is shown in FIGS. 15A-15C. Embodiment 8 differs from Embodiment 1 in its diffractive optical element in terms of its phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, different spacings between the objective lens and the three optical recording media.

In Embodiment 8, the following conditions are satisfied:

$\lambda 1 < \lambda 2 < \lambda 3$   Condition (1)

$NA1 \geqq NA2 > NA3$   Condition (2)

$T1 \leqq T2 < T3$   Condition (3)

$d2 < d3 < d1$   Condition (14)

Table 29 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1$=408 nm for the AOD 9a, $\lambda 2$=658 nm for the DVD 9b, and $\lambda 3$=784 nm for the CD 9c), and the refractive indexes at the three used wavelengths.

TABLE 29

| # | Surface Type or Radius of Curvature | Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | diffractive | 0.500 | 0.500 | 0.500 | 1.55636 | 1.54076 | 1.53704 |
| 2 | aspheric | 2.163 | 0.299 | 0.419 | | | |
| 3 | aspheric | 2.376 | 2.376 | 2.376 | 1.55636 | 1.54076 | 1.53704 |
| 4 | aspheric | 1.764 | 1.898 | 1.530 | | | |
| 5 | ∞ | 0.600 | 0.600 | 1.200 | 1.62000 | 1.58000 | 1.57000 |
| 6 | ∞ | | | | | | |

Table 30 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 30

| | $\lambda 1 = 408$ nm | $\lambda 2 = 658$ nm | $\lambda 3 = 784$ nm |
|---|---|---|---|
| diaphragm diameter | 4.02 | 4.43 | 3.44 |
| focal length, F | 3.01 | 3.47 | 3.47 |
| numerical aperture, NA | 0.65 | 0.65 | 0.50 |
| light source position | ∞ | ∞ | ∞ |
| diffraction order used | 2 | 1 | 1 |

Table 31 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 31 are zero.

TABLE 31

| | 2$^{nd}$ Surface | 3$^{rd}$ Surface | 4$^{th}$ Surface |
|---|---|---|---|
| C | 1.0158342E-1 | 5.2470340E-1 | -1.5453266E-1 |
| K | 0.9998654 | -0.5680783 | -0.6778298 |
| $A_2$ | 7.0615929E-4 | 1.6141492E-2 | 2.2693685E-2 |
| $A_3$ | 5.1510428E-4 | -9.5952850E-5 | -1.1613010E-3 |
| $A_4$ | -2.2018921E-4 | 1.2709206E-4 | -3.9413073E-4 |
| $A_5$ | 3.8318302E-5 | 5.8483712E-6 | 5.4134842E-5 |

Table 32 below lists the values of the phase function coefficients $W_1$-$W_5$ of the 1st surface that forms the diffractive surface of the diffractive optical element $L_1$ of this embodiment. Phase function coefficients not listed in Table 32 are zero. An "E" in the data indicates that the number following the "E" is the exponent to the base 10. For example, "1.0E-2" represents the number $1.0 \times 10^{-2}$.

TABLE 32

| | |
|---|---|
| $W_1$ | 5.6750100E-1 |
| $W_2$ | -9.8100142 |
| $W_3$ | -3.1036922 |
| $W_4$ | 9.6613099E-1 |
| $W_5$ | -1.4955071E-1 |

As is clear from Tables 29 and 30 above, the objective optical system of the present embodiment described above satisfies Conditions (1)-(3) and (14).

Figure 16A:
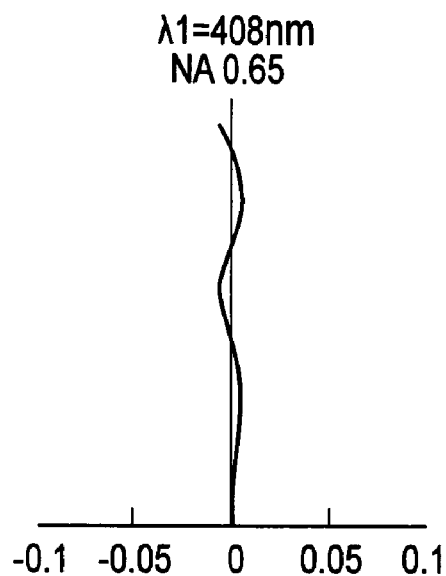
FIGS. 16A-16C illustrate wavefront aberration profiles of the light beams of three wavelengths that are focused to spots by the objective optical system of Embodiment 8 of the present invention, with FIG. 16A illustrating the wavefront aberration profile of the light beam of the first wavelength that is focused to a spot for the first optical recording medium, FIG. 16B illustrating the wavefront aberration profile of the light beam of the second wavelength that is focused to a spot for the second optical recording medium, and FIG. 16C illustrating the wavefront aberration profile of the light beam of the third wavelength that is focused to a spot for the third optical recording medium.
Figure 16B:
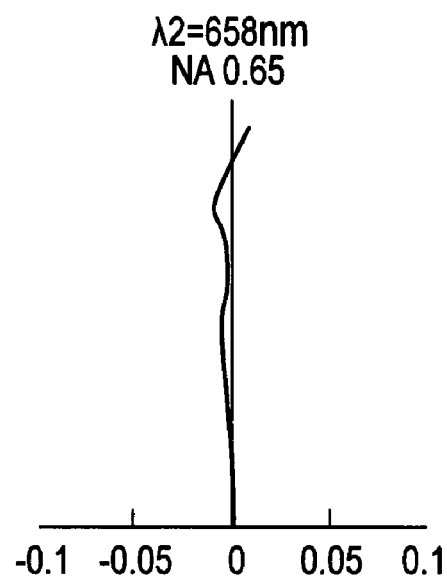
Figure 16C:
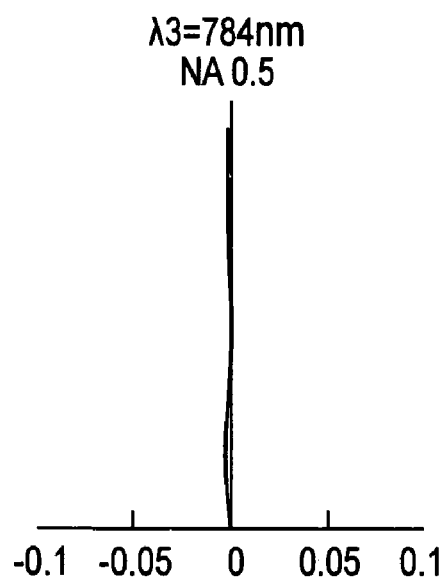

FIGS. 16A-16C illustrate wavefront aberration profiles of the light beams of three wavelengths being imaged to a spot by the objective optical system of Embodiment 8 of the present invention, with FIG. 16A illustrating the wavefront aberration profile of the light beam of the first wavelength being imaged to a spot for the first optical recording medium 9a, which is an AOD, FIG. 16B illustrating the wavefront aberration profile of the light beam of the second wavelength being imaged to a spot for the second optical recording medium 9b, which is a DVD, and FIG. 16C illustrating the wavefront aberration profile of the light beam of the third wavelength being imaged to a spot for the third optical recording medium 9c, which is a CD.

Embodiment 9

Figure 17A:
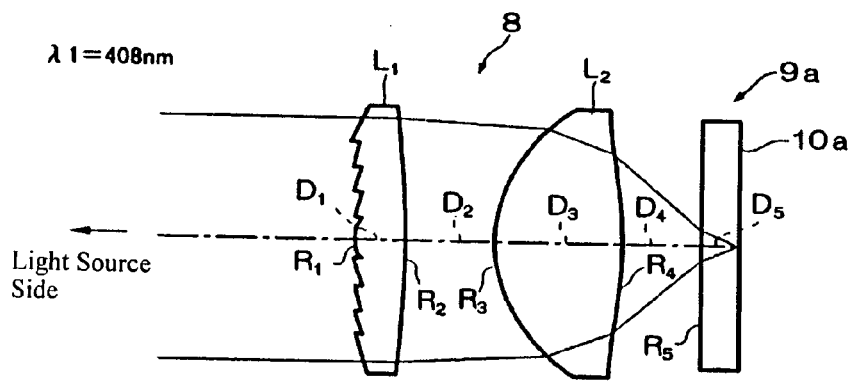
FIGS. 17A-17C are schematic diagrams that depict cross-sectional views of the objective optical system of Embodiment 9 of the present invention, with FIG. 17A showing the operation of the objective optical system when used with optical recording medium 9a, with FIG. 17B showing the operation of the objective optical system when used with a second optical recording medium 9b, and with FIG. 17C showing the operation of the objective optical system when used with a third optical recording medium 9c.
Figure 17B:
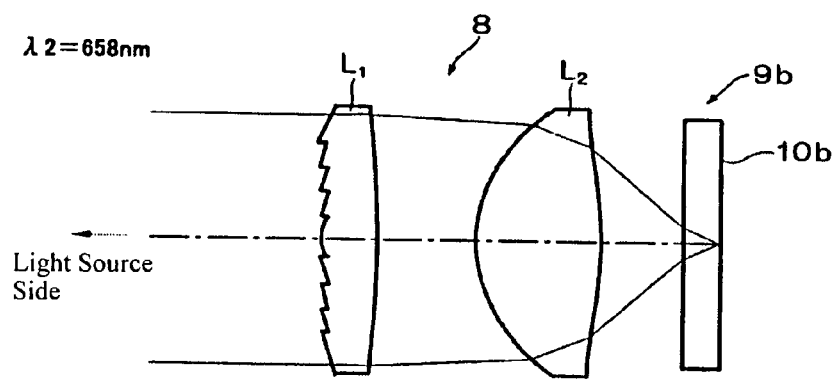
Figure 17C:
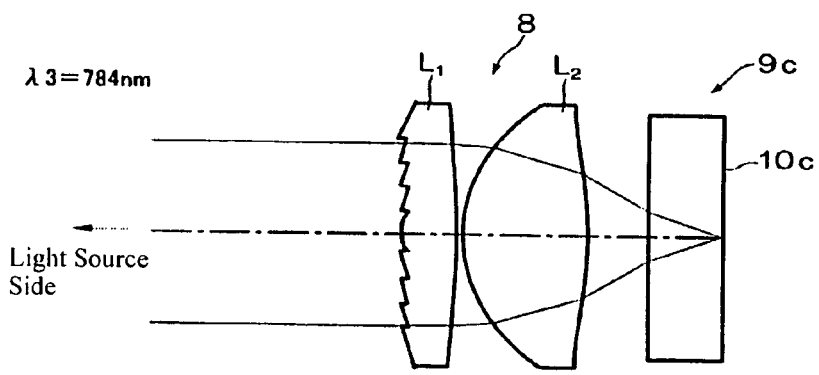

Embodiment 9 is similar to Embodiment 1 and is shown in FIGS. 17A-17C. Embodiment 9 differs from Embodiment 1 in its diffractive optical element in terms of the surface of the diffractive optical element on the objective lens side being convex rather than concave and in its phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, and different spacings between the objective lens and the three optical recording media.

In Embodiment 9 the following conditions are satisfied:

$\lambda 1 < \lambda 2 < \lambda 3$      Condition (1)

$NA1 \geq NA2 > NA3$      Condition (2)

$T1 \leq T2 < T3$      Condition (3)

$d3 < d1 < d2$      Condition (15).

Table 33 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1 = 408$ nm for the AOD 9a, $\lambda 2 = 658$ nm for the DVD 9b, and $\lambda 3 = 784$ nm for the CD 9c), and the refractive indexes at the three used wavelengths.

TABLE 33

| # | Surface Type or Radius of Curvature | Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | diffractive | 0.700 | 0.700 | 0.700 | 1.55636 | 1.54076 | 1.53704 |
| 2 | aspheric | 1.400 | 1.600 | 0.100 | | | |
| 3 | aspheric | 2.000 | 2.000 | 2.000 | 1.55636 | 1.54076 | 1.53704 |
| 4 | aspheric | 1.240 | 1.320 | 0.968 | | | |
| 5 | ∞ | 0.600 | 0.600 | 1.200 | 1.62000 | 1.58000 | 1.57000 |
| 6 | ∞ | | | | | | |

Table 34 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 34

| | $\lambda 1 = 408$ nm | $\lambda 2 = 658$ nm | $\lambda 3 = 784$ nm |
|---|---|---|---|
| diaphragm diameter | 3.9 | 4.0 | 3.0 |
| focal length, f | 3.00 | 3.12 | 2.89 |
| numerical aperture, NA | 0.65 | 0.65 | 0.51 |
| light source position | ∞ | ∞ | ∞ |
| diffraction order used | 2 | 1 | 1 |

Table 35 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 35 are zero.

TABLE 35

| | $2^{nd}$ Surface | $3^{rd}$ Surface | $4^{th}$ Surface |
|---|---|---|---|
| C | −7.5473230E−2 | 4.5013974E−1 | −1.5264254E−1 |
| K | 0.9999982 | 4.4737881E−2 | 5.0673426E−2 |
| $A_2$ | 2.0591830E−3 | 5.3931222E−3 | −4.1747742E−3 |
| $A_3$ | −2.1388651E−4 | −3.3437659E−4 | 6.1720455E−3 |
| $A_4$ | 9.9390794E−5 | 3.1002578E−4 | −1.3344398E−3 |
| $A_5$ | −1.3120846E−5 | −7.8185866E−6 | 1.1216502E−4 |

Table 36 below lists the values of the phase function coefficients $W_1$-$W_5$ of the 1st surface that forms the diffractive surface of the diffractive optical element $L_1$ of this embodiment. Phase function coefficients not listed in Table 36 are zero. An "E" in the data indicates that the number following the "E" is the exponent to the base 10. For example, "1.0E-2" represents the number $1.0 \times 10^{-2}$.

TABLE 36

| | |
|---|---|
| $W_1$ | −7.3537036E+1 |
| $W_2$ | 3.3466185E−1 |
| $W_3$ | 6.9014342E−1 |
| $W_4$ | 2.3620640E−1 |
| $W_5$ | −1.4807279E−2 |

As is clear from Tables 33 and 34 above, the objective optical system of the present embodiment described above satisfies Conditions (1)-(3) and (15).

Figures 18A, 18B:
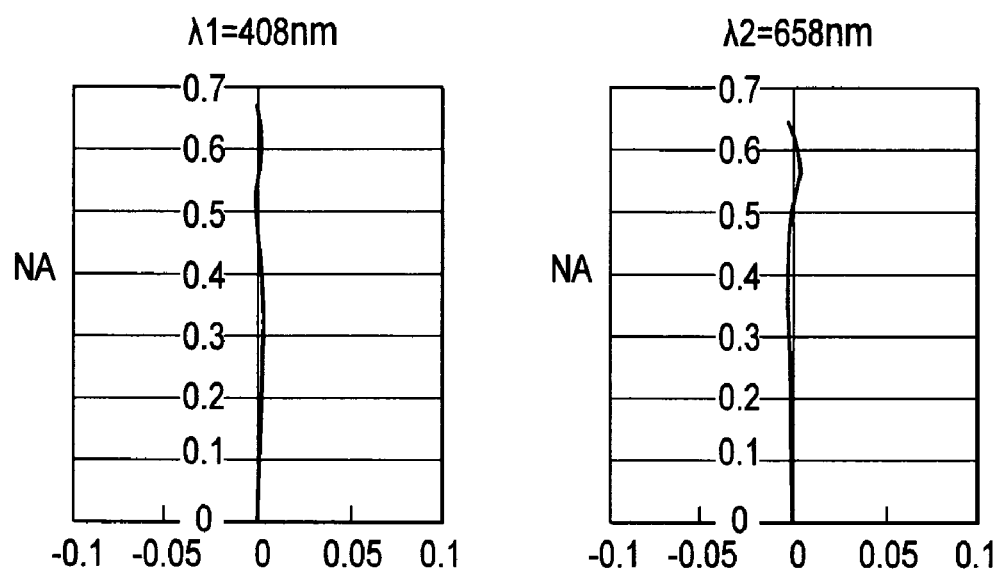
FIGS. 18A-18C illustrate wavefront aberration profiles of the light beams of three wavelengths that are focused to spots by the objective optical system of Embodiment 9 of the present invention, with FIG. 18A illustrating the wavefront aberration profile of the light beam of the first wavelength that is focused to a spot for the first optical recording medium, FIG. 18B illustrating the wavefront aberration profile of the light beam of the second wavelength that is focused to a spot for the second optical recording medium, and FIG. 18C illustrating the wavefront aberration profile of the light beam of the third wavelength that is focused to a spot for the third optical recording medium.
Figure 18C:
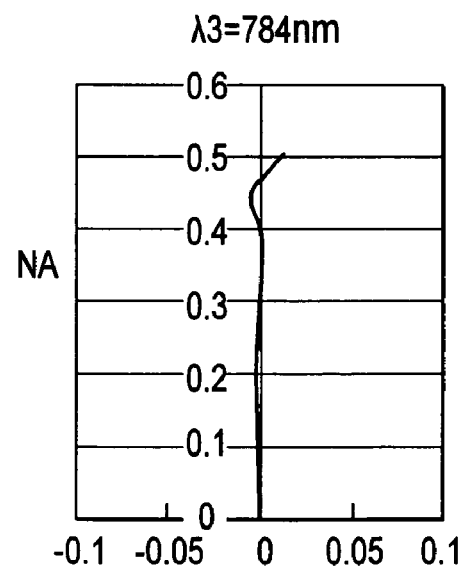

FIGS. 18A-18C illustrate wavefront aberration profiles of the light beams of three wavelengths being imaged to a spot by the objective optical system of Embodiment 9 of the present invention, with FIG. 18A illustrating the wavefront aberration profile of the light beam of the first wavelength being imaged to a spot for the first optical recording medium 9a, which is an AOD, FIG. 18B illustrating the wavefront aberration profile of the light beam of the second wavelength being imaged to a spot for the second optical recording medium 9b, which is a DVD, and FIG. 18C illustrating the wavefront aberration profile of the light beam of the third wavelength being imaged to a spot for the third optical recording medium 9c, which is a CD.

Embodiment 10

Figure 19A:
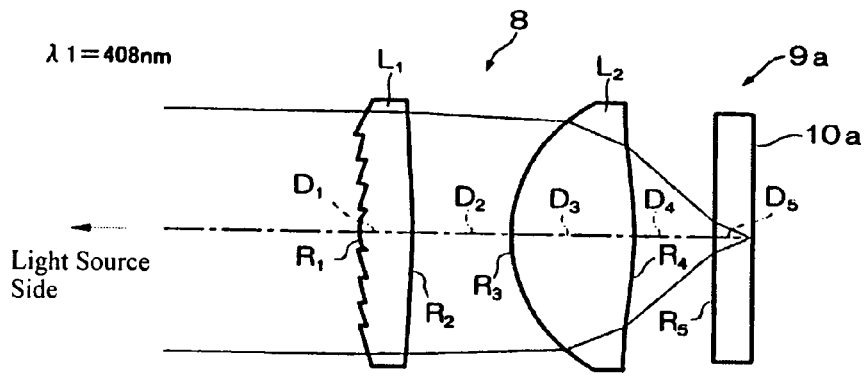
FIGS. 19A-19C are schematic diagrams that depict cross-sectional views of the objective optical system of Embodiment 10 of the present invention, with FIG. 19A showing the operation of the objective optical system when used with optical recording medium 9a, with FIG. 19B showing the operation of the objective optical system when used with a second optical recording medium 9b, and with FIG. 19C showing the operation of the objective optical system when used with a third optical recording medium 9c.
Figure 19B:
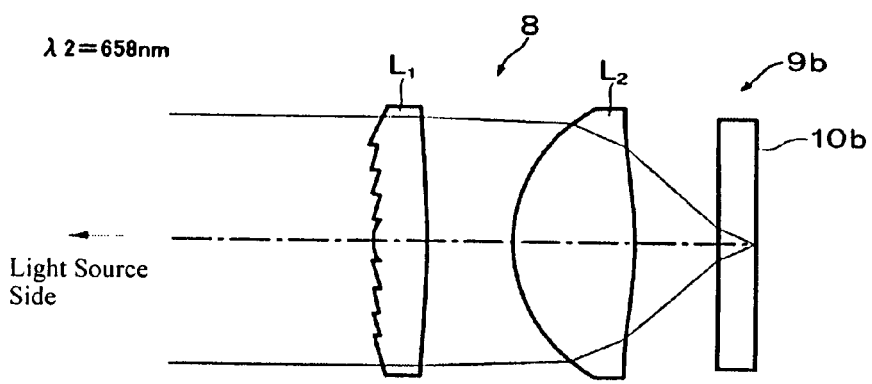
Figure 19C:
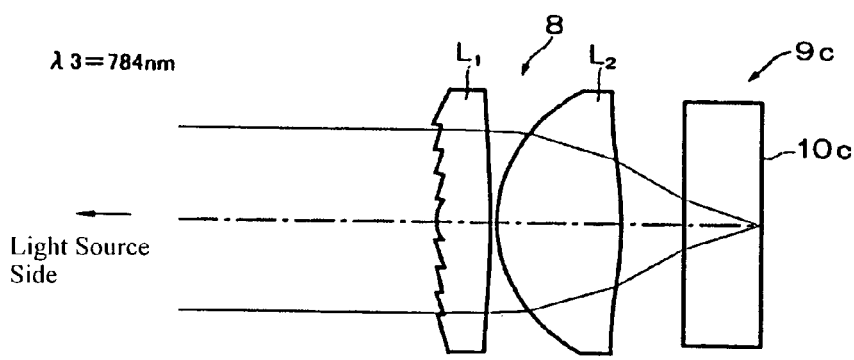

Embodiment 10 is similar to Embodiment 1 and is shown in FIGS. 19A-19C. Embodiment 10 differs from Embodiment 1 in its diffractive optical element in terms of the surface of the diffractive optical element on the objective lens side being convex rather than concave and in its phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, and different spacings between the objective lens and the three optical recording media.

In Embodiment 10 the following conditions are satisfied:

λ1<λ2<λ3    Condition (1)

NA1≧NA2>NA3    Condition (2)

T1≦T2<T3    Condition (3)

d1>d2>d3    Condition (16)

Table 37 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths (λ1=408 nm for the AOD 9a, λ2=658 nm for the DVD 9b, and λ3=784 nm for the CD 9c), and the refractive indexes at the three used wavelengths.

TABLE 37

| # | Surface Type or Radius of Curvature | Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | diffractive | 0.700 | 0.700 | 0.700 | 1.55636 | 1.54076 | 1.53704 |
| 2 | aspheric | 1.600 | 1.400 | 0.100 | | | |
| 3 | aspheric | 2.000 | 2.000 | 2.000 | 1.55636 | 1.54076 | 1.53704 |
| 4 | aspheric | 1.263 | 1.345 | 0.986 | | | |
| 5 | ∞ | 0.600 | 0.600 | 1.200 | 1.62000 | 1.58000 | 1.57000 |
| 6 | ∞ | | | | | | |

Table 38 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 38

| | $\lambda 1 = 408$ nm | $\lambda 2 = 658$ nm | $\lambda 3 = 784$ nm |
|---|---|---|---|
| diaphragm diameter | 3.9 | 4.0 | 3.0 |
| focal length, f | 3.00 | 3.05 | 2.88 |
| numerical aperture, NA | 0.65 | 0.65 | 0.51 |
| light source position | ∞ | ∞ | ∞ |
| diffraction order used | 2 | 1 | 1 |

Table 39 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 39 are zero.

TABLE 39

| | $2^{nd}$ Surface | $3^{rd}$ Surface | $4^{th}$ Surface |
|---|---|---|---|
| C | −7.0768883E−2 | 4.5669746E−1 | −1.6323896E−1 |
| K | 0.9999976 | 4.4737881E−2 | 5.0670571E−2 |
| $A_2$ | 2.2614965E−3 | 5.5378717E−3 | 4.3919252E−4 |
| $A_3$ | 7.0192879E−4 | 2.8012377E−4 | 8.8323346E−3 |
| $A_4$ | −1.0968324E−4 | 5.3118128E−4 | −2.5213526E−3 |
| $A_5$ | 1.0690286E−6 | −4.3288644E−5 | 2.3411777E−4 |

Table 40 below lists the values of the phase function coefficients $W_1$-$W_5$ of the 1st surface that forms the diffractive surface of the diffractive optical element $L_1$ of this embodiment. Phase function coefficients not listed in Table 40 are zero. An "E" in the data indicates that the number following the "E" is the exponent to the base 10. For example, "1.0E-2" represents the number $1.0 \times 10^{-2}$.

TABLE 40

| | |
|---|---|
| $W_1$ | −5.2820447E+1 |
| $W_2$ | −1.3942047 |
| $W_3$ | −2.1446168 |
| $W_4$ | 1.1197261 |
| $W_5$ | −1.1224427E−1 |

As is clear from Tables 37 and 38 above, the objective optical system of the present embodiment described above satisfies Conditions (1)-(3) and (16).

Figure 20A:
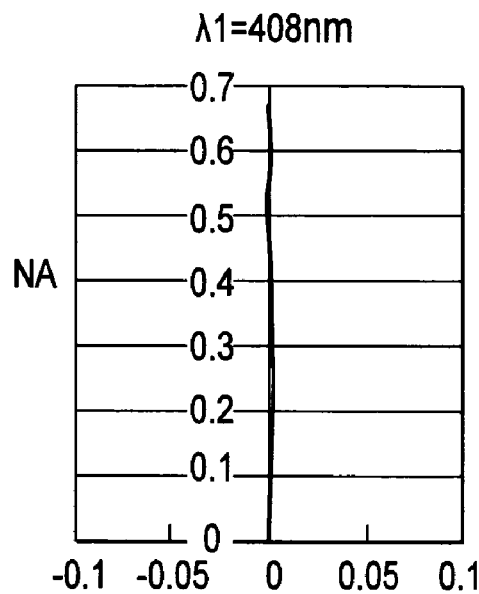
FIGS. 20A-20C illustrate wavefront aberration profiles of the light beams of three wavelengths that are focused to spots by the objective optical system of Embodiment 10 of the present invention, with FIG. 20A illustrating the wavefront aberration profile of the light beam of the first wavelength that is focused to a spot for the first optical recording medium, FIG. 20B illustrating the wavefront aberration profile of the light beam of the second wavelength that is focused to a spot for the second optical recording medium, and FIG. 20C illustrating the wavefront aberration profile of the light beam of the third wavelength that is focused to a spot for the third optical recording medium.
Figure 20B:
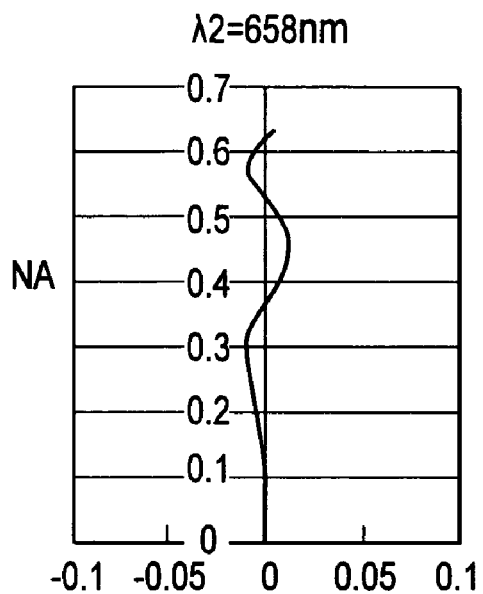
Figure 20C:
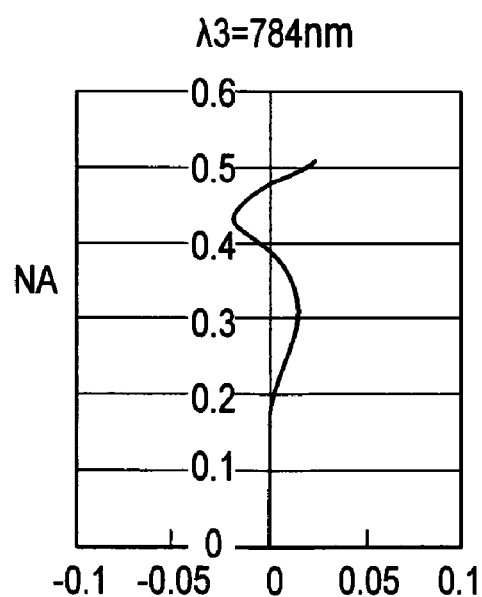

FIGS. 20A-20C illustrate wavefront aberration profiles of the light beams of three wavelengths being imaged to a spot by the objective optical system of Embodiment 10 of the present invention, with FIG. 20A illustrating the wavefront aberration profile of the light beam of the first wavelength being imaged to a spot for the first optical recording medium 9a, which is an AOD, FIG. 20B illustrating the wavefront aberration profile of the light beam of the second wavelength being imaged to a spot for the second optical recording medium 9b, which is a DVD, and FIG. 20C illustrating the wavefront aberration profile of the light beam of the third wavelength being imaged to a spot for the third optical recording medium 9c, which is a CD.

Embodiment 11

Figure 21A:
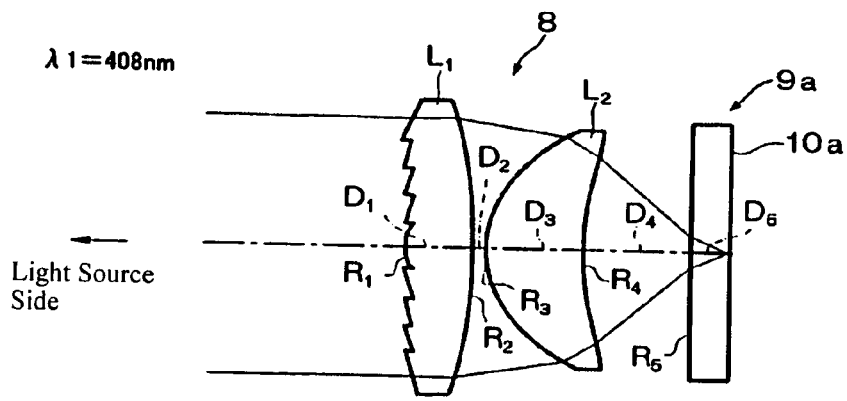
FIGS. 21A-21C are schematic diagrams that depict cross-sectional views of the objective optical system of Embodiment 11 of the present invention, with FIG. 21A showing the operation of the objective optical system when used with optical recording medium 9a, with FIG. 21B showing the operation of the objective optical system when used with a second optical recording medium 9b, and with FIG. 21C showing the operation of the objective optical system when used with a third optical recording medium 9c.
Figure 21B:
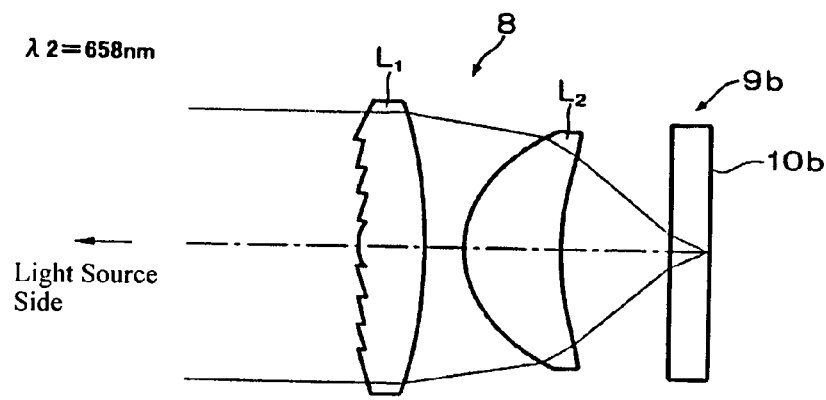
Figure 21C:
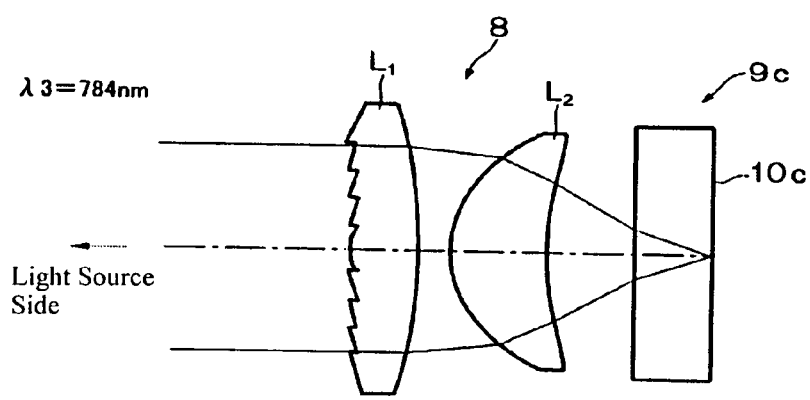

Embodiment 11 is similar to Embodiment 1 and is shown in FIGS. 21A-21C. Embodiment 11 differs from Embodiment 1 in its diffractive optical element in terms of the surface of the diffractive optical element on the objective lens side being convex rather than concave and in its phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, different spacings between the objective lens and the three optical recording media, and the recording medium side of the objective lens being concave rather than convex.

In Embodiment 11 the following conditions are satisfied:

$\lambda 1 < \lambda 2 < \lambda 3$   Condition (1)

$NA1 \geq NA2 > NA3$   Condition (2)

$T1 \leq T2 < T3$   Condition (3)

$d2 > d3 > d1$   Condition (17).

Table 41 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1$=408 nm for the AOD 9a, $\lambda 2$=658 nm for the DVD 9b, and $\lambda 3$=784 nm for the CD 9c), and the refractive indexes at the three used wavelengths.

TABLE 41

| # | Surface Type or Radius of Curvature | Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | diffractive | 0.800 | 0.800 | 0.800 | 1.55636 | 1.54076 | 1.53704 |
| 2 | aspheric | 0.200 | 0.607 | 0.497 | | | |
| 3 | aspheric | 1.506 | 1.506 | 1.506 | 1.55636 | 1.54076 | 1.53704 |
| 4 | aspheric | 1.633 | 1.661 | 1.340 | | | |
| 5 | ∞ | 0.600 | 0.600 | 1.200 | 1.62000 | 1.58000 | 1.57000 |
| 6 | ∞ | | | | | | |

Table 42 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 42

| | $\lambda 1 = 408$ nm | $\lambda 2 = 658$ nm | $\lambda 3 = 784$ nm |
|---|---|---|---|
| diaphragm diameter | 4.04 | 4.25 | 3.25 |
| focal length, f | 3.14 | 3.24 | 3.29 |
| numerical aperture, NA | 0.65 | 0.65 | 0.50 |
| light source position | ∞ | ∞ | ∞ |
| diffraction order used | 2 | 1 | 1 |

Table 43 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 43 are zero.

TABLE 43

| | $2^{nd}$ Surface | $3^{rd}$ Surface | $4^{th}$ Surface |
|---|---|---|---|
| C | -9.5568630E-2 | 6.2967351E-1 | 1.7976905E-1 |
| K | 1.0000000 | -0.3766377 | -0.4411435 |
| $A_2$ | -7.0735223E-3 | 2.9320679E-2 | 4.2131949E-2 |
| $A_3$ | 1.5697104E-3 | 1.3062380E-3 | -2.9957917E-2 |
| $A_4$ | -1.8639684E-4 | 3.9882128E-4 | 7.8895219E-3 |
| $A_5$ | 5.1415616E-6 | -5.1090641E-5 | -8.2898102E-4 |

Table 44 below lists the values of the phase function coefficients $W_1$-$W_5$ of the 1st surface that forms the diffractive surface of the diffractive optical element $L_1$ of this embodiment. Phase function coefficients not listed in Table 44 are zero. An "E" in the data indicates that the number following the "E" is the exponent to the base 10. For example, "1.0E-2" represents the number $1.0 \times 10^{-2}$.

TABLE 44

| | |
|---|---|
| $W_1$ | 9.5171946E+1 |
| $W_2$ | -9.9327818 |
| $W_3$ | -2.0758654 |
| $W_4$ | 3.0161432E-1 |
| $W_5$ | 2.0513275E-2 |

As is clear from Tables 41 and 42 above, the objective optical system of the present embodiment described above satisfies Conditions (1)-(3) and (17).

Figures 22A, 22B:
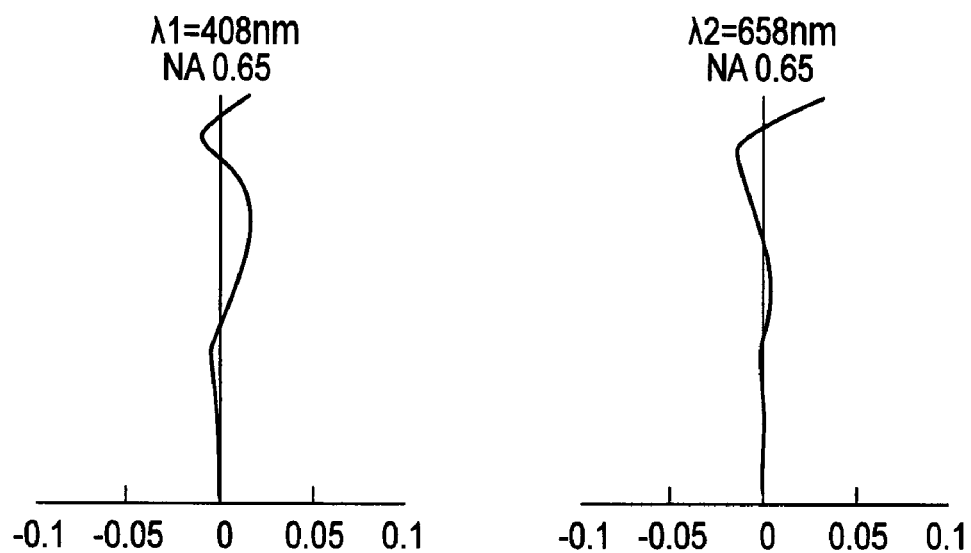
FIGS. 22A-22C illustrate wavefront aberration profiles of the light beams of three wavelengths that are focused to spots by the objective optical system of Embodiment 11 of the present invention, with FIG. 22A illustrating the wavefront aberration profile of the light beam of the first wavelength that is focused to a spot for the first optical recording medium, FIG. 22B illustrating the wavefront aberration profile of the light beam of the second wavelength that is focused to a spot for the second optical recording medium, and FIG. 22C illustrating the wavefront aberration profile of the light beam of the third wavelength that is focused to a spot for the third optical recording medium.
Figure 22C:
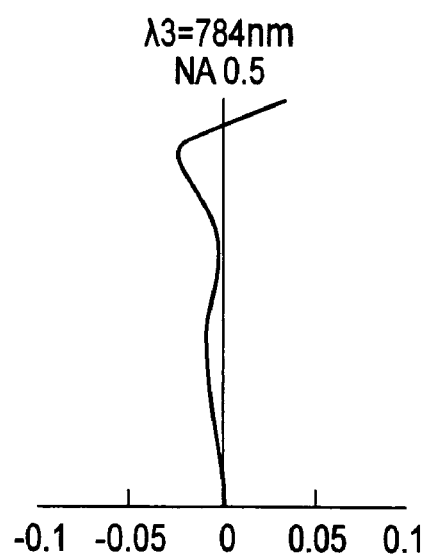

FIGS. 22A-22C illustrate wavefront aberration profiles of the light beams of three wavelengths being imaged to a spot by the objective optical system of Embodiment 11 of the present invention, with FIG. 22A illustrating the wavefront aberration profile of the light beam of the first wavelength being imaged to a spot for the first optical recording medium 9a, which is an AOD, FIG. 22B illustrating the wavefront aberration profile of the light beam of the second wavelength being imaged to a spot for the second optical recording medium 9b, which is a DVD, and FIG. 22C illustrating the wavefront aberration profile of the light beam of the third wavelength being imaged to a spot for the third optical recording medium 9c, which is a CD.

Embodiment 12

Figure 23A:
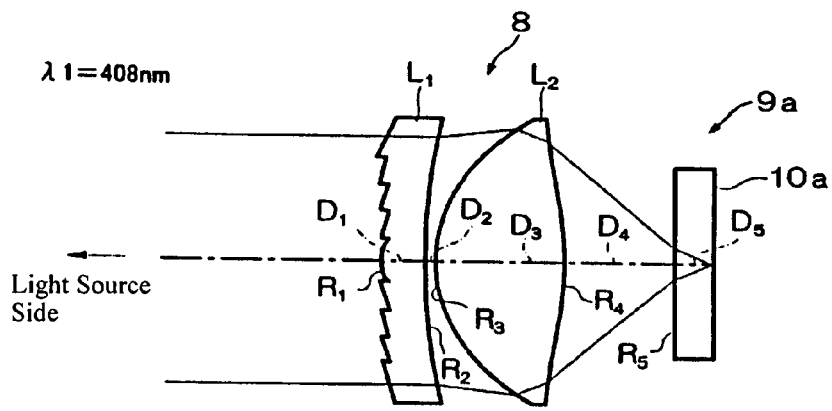
FIGS. 23A-23C are schematic diagrams that depict cross-sectional views of the objective optical system of Embodiment 12 of the present invention, with FIG. 23A showing the operation of the objective optical system when used with optical recording medium 9a, with FIG. 23B showing the operation of the objective optical system when used with a second optical recording medium 9b, and with FIG. 23C showing the operation of the objective optical system when used with a third optical recording medium 9c.
Figure 23B:
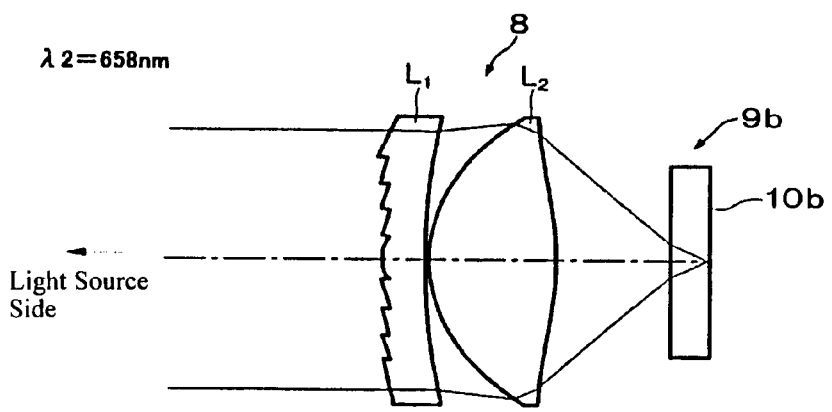
Figure 23C:
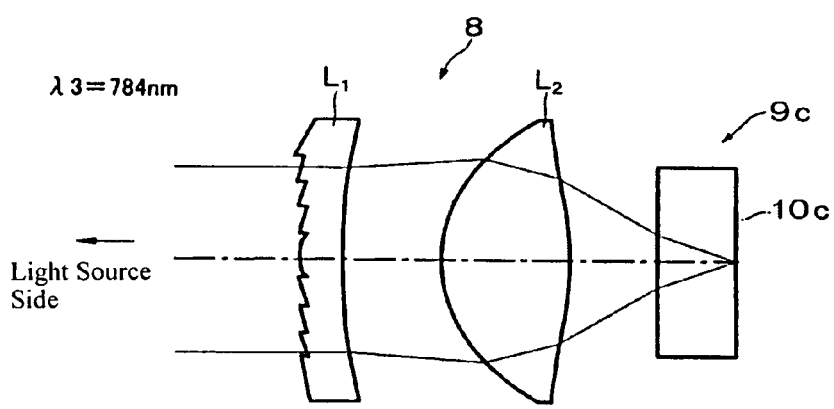

Embodiment 12 is similar to Embodiment 1 and is shown in FIGS. 23A-23C. Embodiment 12 differs from Embodiment 1 in its diffractive optical element in terms of its phase function coefficients, as well as in its diffractive optical element objective lens side refractive surface configuration and its objective lens configuration in terms of different values of the constants C, K and the aspheric coefficients of the aspheric surfaces, different spacings between the diffractive optical element and the objective lens, and different spacings between the objective lens and the three optical recording media.

In Embodiment 12 the following conditions are satisfied:

$\lambda 1 < \lambda 2 < \lambda 3$   Condition (1)

$NA1 \geq NA2 > NA3$   Condition (2)

$T1 \leq T2 < T3$   Condition (3)

$d3 > d1 > d2$   Condition (18).

Table 45 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1$=408 nm for the AOD 9a, $\lambda 2$=658 nm for the DVD 9b, and $\lambda 3$=784 nm for the CD 9c), and the refractive indexes at the three used wavelengths.

TABLE 45

| # | Surface Type or Radius of Curvature | Surface Spacing $\lambda 1 = 408$ nm | $\lambda 2 = 658$ nm | $\lambda 3 = 784$ nm | Refractive Index $\lambda 1 = 408$ nm | $\lambda 2 = 658$ nm | $\lambda 3 = 784$ nm |
|---|---|---|---|---|---|---|---|
| 1 | diffractive | 0.500 | 0.500 | 0.500 | 1.55636 | 1.54076 | 1.53704 |
| 2 | aspheric | 0.150 | 0.050 | 1.500 | | | |
| 3 | aspheric | 2.000 | 2.000 | 2.000 | 1.55636 | 1.54076 | 1.53704 |
| 4 | aspheric | 1.663 | 1.759 | 1.358 | | | |
| 5 | ∞ | 0.600 | 0.600 | 1.200 | 1.62000 | 1.58000 | 1.57000 |
| 6 | ∞ | | | | | | |

Table 46 below lists, for each used wavelength, the diaphragm diameter (in mm), the focal length f (in mm), the numerical aperture NA, the apparent light source position (in mm, as measured from the diffractive surface of the diffractive optical element $L_1$), and the diffraction order of the diffracted light being used.

TABLE 46

| | $\lambda 1 = 408$ nm | $\lambda 2 = 658$ nm | $\lambda 3 = 784$ nm |
|---|---|---|---|
| diaphragm diameter | 3.9 | 4.1 | 2.9 |
| focal length, f | 3.00 | 3.11 | 3.05 |
| numerical aperture, NA | 0.65 | 0.65 | 0.51 |
| light source position | ∞ | ∞ | ∞ |
| diffraction order used | 2 | 1 | 1 |

Table 47 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 47 are zero.

TABLE 47

| | $2^{nd}$ Surface | $3^{rd}$ Surface | $4^{th}$ Surface |
|---|---|---|---|
| C | 6.0210023E-2 | 4.6696615E-1 | -2.2954707E-1 |
| K | 1.0000005 | 4.4737881E-2 | 5.0667597E-2 |
| $A_2$ | 9.6806438E-3 | 1.0849430E-2 | 9.8179404E-3 |
| $A_3$ | -2.1572950E-3 | -1.2168587E-3 | 2.7042250E-3 |
| $A_4$ | 3.6380206E-4 | 5.1548304E-4 | -7.7696253E-4 |
| $A_5$ | -3.4784536E-5 | -4.5898944E-5 | 5.9617168E-5 |

Table 48 below lists the values of the phase function coefficients $W_1$-$W_5$ of the 1st surface that forms the diffractive surface of the diffractive optical element $L_1$ of this embodiment. Phase function coefficients not listed in Table 48 are zero. An "E" in the data indicates that the number following the "E" is the exponent to the base 10. For example, "1.0E-2" represents the number $1.0 \times 10^{-2}$.

TABLE 48

| | |
|---|---|
| $W_1$ | -8.3174577E+1 |
| $W_2$ | 1.8825979 |
| $W_3$ | 3.3444428 |
| $W_4$ | 2.4223221E-1 |
| $W_5$ | -1.2751346E-1 |

As is clear from Tables 45 and 46 above, the objective optical system of the present embodiment described above satisfies Conditions (1)-(3) and (18).

Figures 24A, 24B:
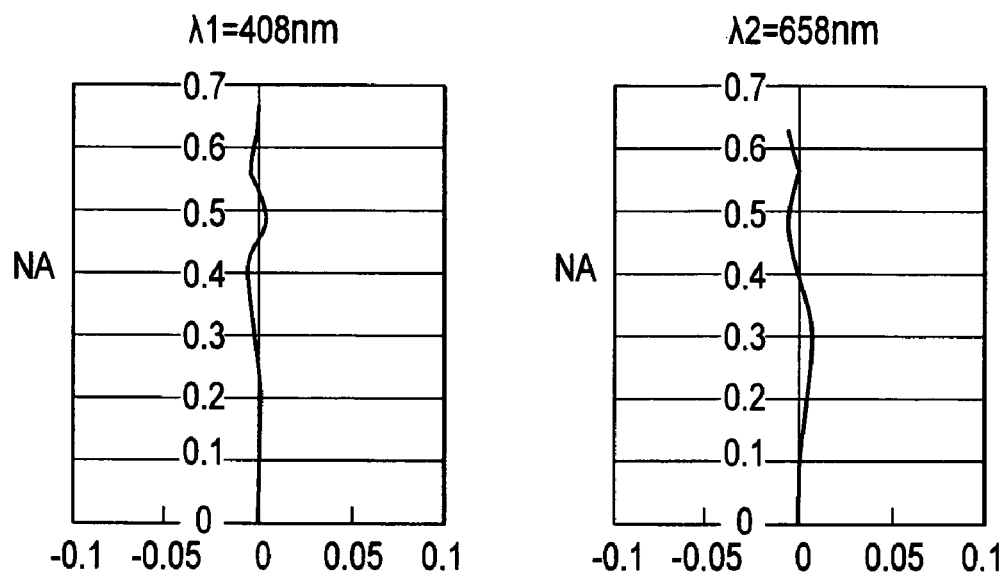
FIGS. 24A-24C illustrate wavefront aberration profiles of the light beams of three wavelengths that are focused to spots by the objective optical system of Embodiment 12 of the present invention, with FIG. 24A illustrating the wavefront aberration profile of the light beam of the first wavelength that is focused to a spot for the first optical recording medium, FIG. 24B illustrating the wavefront aberration profile of the light beam of the second wavelength that is focused to a spot for the second optical recording medium, and FIG. 24C illustrating the wavefront aberration profile of the light beam of the third wavelength that is focused to a spot for the third optical recording medium.
Figure 24C:
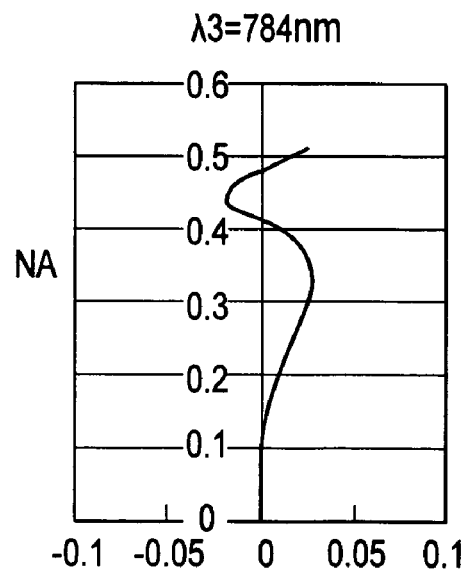

FIGS. 24A-24C illustrate wavefront aberration profiles of the light beams of three wavelengths being imaged to a spot by the objective optical system of Embodiment 12 of the present invention, with FIG. 24A illustrating the wavefront aberration profile of the light beam of the first wavelength being imaged to a spot for the first optical recording medium 9a, which is an AOD, FIG. 24B illustrating the wavefront aberration profile of the light beam of the second wavelength being imaged to a spot for the second optical recording medium 9b, which is a DVD, and FIG. 24C illustrating the wavefront aberration profile of the light beam of the third wavelength being imaged to a spot for the third optical recording medium 9c, which is a CD.

The objective optical system for optical recording media of the present invention being thus described, it will be obvious that it can be varied in many ways. Likewise, the optical pickup device of the present invention being thus described, it will also be obvious that it can be varied in many ways.

Additionally, although in the embodiments described above, the light source side of the diffractive optical element is the diffractive surface and the surface facing the optical recording medium is the concave spherical surface, the location of these two surfaces may be switched.

Furthermore, in the diffractive surface diffracting light of one of the three wavelengths in a predetermined order, it is preferable that a large quantity of light be diffracted, particularly as close to one hundred percent as is practical. Additionally, the structure of the diffractive optical surface is not limited to serrations, as stepped structures may be included or substituted.

In the objective optical system for optical recording media and the optical pickup device of the present invention, the optical recording media, which are used for recording and reproducing, are not limited to AODs, DVDs, and CDs. Rather, the present invention relates to optical systems and devices for recording and reproducing information with optical recording media that satisfy appropriate combinations of Conditions (1)-(3) above with a common optical pickup device. For example, instead of the AOD in the above described embodiments, a Blu-ray disk arrangement with a numerical aperture (NA) of 0.85, a recording medium substrate thickness of 0.1 mm, and a light beam with a wavelength of approximately 405 nm may be used.

Furthermore, even in the case when an AOD, a DVD and a CD are used as the optical recording media, as in the embodiments described above, the wavelengths of the light beams used are not limited to the particular values described above. For example, even if a light beam with a wavelength other than 408 nm is used for the AOD, a light beam with a wavelength other than 658 nm is used for the DVD, or a light beam with a wavelength other than 784 nm is used for the CD, as long as the beam of light to be used satisfies the technical standards described above for each optical recording medium, the wavelengths can be varied within a broad range.

Additionally, broad variations apply to the choices of numerical apertures and the substrate thicknesses within the scope of the present invention.

The objective optical system may be further varied with regard to various embodiments of the present invention. For example, the objective optical system includes two elements, a diffractive optical element and an objective lens, so that either of these optical elements may be tilted in order to correct for coma which is generated due to tilt of the optical recording medium.

Additionally, in Embodiments 1-12 above, the diffractive surface of the diffractive optical element of the above-mentioned embodiments is the surface on the light source side of the objective optical system and is formed on a virtual plane, and the surface on the recording medium side is a rotationally symmetric aspheric surface. However, the diffractive optical element is not limited to such construction.

For example, the diffractive optical surface can be formed on a convex or concave surface so that the surface will have refractive power. Additionally, the refractive surface can be an aspheric surface. Furthermore, the diffractive optical element can be designed so that the surface on the light source side is a rotationally symmetric aspheric surface and the surface on the optical recording medium side is a diffractive optical surface. Additionally, although in the embodiments described above one surface of the diffractive optical element is not a diffractive surface and is a rotationally symmetry aspheric surface, that surface may be planar, spherical, or a non-rotationally symmetric aspheric surface. For example, it is possible for a diffractive optical surface to be formed on a surface that has refractive power and for the other surface to be planar. Additionally, both surfaces of the diffractive optical element can be diffractive surfaces.

Furthermore, various designs are acceptable as long as the objective lens of the objective optical system is a lens that has positive refractive power. That is, the objective lens is not limited to embodiments where both the surface on the light source side and the surface on the optical recording medium side are rotationally symmetric aspheric surfaces. For example, either of the surfaces may be a plane, a spherical surface or a non-rotationally symmetric aspheric surface, independent of the choice of the shape of the other surface of the objective lens.

Additionally, it is also presumed that in the future optical recording media with technical standards that are other than the technical standards mentioned above will be developed, for example, technical standards related to additionally shortening the wavelength of light used. However, such future development is within the scope of the present invention.

Furthermore, in the present invention, as the optical material of the optical elements of the objective optical system, it is preferable to use a material that has excellent transmittance with the wavelengths of light used. For example, for light of appropriate wavelengths, fluorite or quartz may be good choices for the optical material of the optical elements of the objective optical system of the present invention.

Additionally, the present invention is not limited to a certain number of types of optical recording media being used, such as three types as generally described above, but the objective optical system of the present invention may relate to four or more types of optical recording media.

Furthermore, although, as generally described above, the optical pickup devices include three light emitting devices that emit light beams of different wavelengths that are separately combined, combining the light beams can be further integrated. For example, light beams of different wavelengths may be produced at adjacent output ports and, for example, a single prism used to combine the light beams instead of two prisms (as shown with regard to prisms 2a and 2b of FIG. 25).

Additionally, in the optical pickup devices, a diaphragm or an aperture limiting element with wavelength selectivity may be arranged at the light source side of the objective optical system and/or the diffractive optical element $L_1$ or the objective lens $L_2$ can function as an aperture limiting structure.

Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An objective optical system for focusing light from a light source onto optical recording media, the objective optical system comprising, in order from the light source side along an optical axis:

a diffractive optical element having negative refractive power and a diffractive surface on one side; and an objective lens having positive refractive power and a rotationally symmetric aspheric surface on each side;

wherein the distance along the optical axis between the diffractive optical element and the objective lens is variable;

the objective optical system is configured to receive a collimated light beam of a first wavelength $\lambda 1$ on its light source side and focus second-order diffracted light diffracted by the diffractive surface of the diffractive optical element at a first numerical aperture NA1 onto a desired portion of a first optical recording medium having a substrate thickness T1 when the distance along the optical axis between the diffractive optical element and the objective lens is d1, to receive a collimated light beam of a second wavelength $\lambda 2$ on its light source side and focus first-order diffracted light diffracted by the diffractive surface of the diffractive optical element at a second numerical aperture NA2 onto a desired portion of a second optical recording medium having a substrate thickness T2 when the distance along the optical axis between the diffractive optical element and the objective lens is d2, and to receive a collimated light beam of a third wavelength $\lambda 3$ on its light source side and focus first-order diffracted light diffracted by the diffractive surface of the diffractive optical element at a third numerical aperture NA3 onto a desired portion of a third optical recording medium having a substrate thickness T3 when the distance along the optical axis between the diffractive optical element and the objective lens is d3; and the following conditions are satisfied:

$\lambda 1 < \lambda 2 < \lambda 3$ $NA1 \geq NA2 \geq NA3$ $T1 \leq T2 < T3$ $d1 < d3$ $d2 < d3.$ 2. The objective optical system according to claim 1, wherein the diffractive surface is formed as a diffractive structure on a virtual plane that is perpendicular to the optical axis.

3. The objective optical system according to claim 1, wherein a surface other than the diffractive surface of the diffractive optical element is a rotationally symmetric concave surface.

4. The objective optical system according to claim 1, wherein:
the first optical recording medium is an AOD;
the second optical recording medium is a DVD; and
the third optical recording medium is a CD.

5. An optical pickup device that includes the objective optical system according to claim 1.

6. An objective optical system for focusing light from a light source onto optical recording media, the objective optical system comprising, in order from the light source side along an optical axis:
a diffractive optical element having a diffractive surface on one side; and
an objective lens having positive refractive power; wherein
the distance along the optical axis between the diffractive optical element and the objective lens is variable;
the objective optical system is configured to receive a collimated light beam of a first wavelength λ1 on its light source side and focus diffracted light diffracted by the diffractive surface of the diffractive optical element at a first numerical aperture NA1 onto a desired portion of a first optical recording medium having a substrate thickness T1 when the distance along the optical axis between the diffractive optical element and the objective lens is d1, to receive a collimated light beam of a second wavelength λ2 on its light source side and focus diffracted light diffracted by the diffractive surface of the diffractive optical element at a second numerical aperture NA2 onto a desired portion of a second optical recording medium having a substrate thickness T2 when the distance along the optical axis between the diffractive optical element and the objective lens is d2, and to receive a collimated light beam of a third wavelength λ3 on its light source side and focus diffracted light diffracted by the diffractive surface of the diffractive optical element at a third numerical aperture NA3 onto a desired portion of a third optical recording medium having a substrate thickness T3 when the distance along the optical axis between the diffractive optical element and the objective lens is d3;
the distances d1, d2, and d3 are not all equal; and
the following conditions are satisfied:

λ1<λ2<λ3

NA1≧NA2>NA3

T1≦T2<T3.

7. The objective optical system of claim 6, wherein the diffractive optical element has negative refractive power.

8. The objective optical system of the claim 6, wherein the diffractive optical element has positive refractive power.

9. The objective optical system of claim 6, wherein two of the three distance distances d1, d2, and d3 are equal to each other and the third distance is unequal to the two distances that are equal to each other.

10. The objective optical system of claim 6, wherein the following conditions are satisfied:

d1=d2 d1<d3.

11. The objective optical system of claim 6, wherein the following conditions are satisfied:

d1=d2 d1>d3.

12. The objective optical system of claim 6, wherein the following conditions are satisfied:

d2=d3 d2<d1.

13. The objective optical system of claim 6, wherein the following conditions are satisfied:

d2=d3 d2>d1.

14. The objective optical system of claim 6, wherein the following conditions are satisfied:

d3=d1 d3>d2.

15. The objective optical system of claim 6, wherein the following conditions are satisfied:

d3=d1 d2<d3.

16. The objective optical system of claim 6, wherein no two of the distances d1, d2, and d3 are equal to one another.

17. The objective optical system of claim 6, wherein the following condition is satisfied:

d1<d2<d3.

18. The objective optical system of claim 6, wherein the following condition is satisfied:

d2<d3<d1.

19. The objective optical system of claim 6, wherein the following condition is satisfied:

d3<d1<d2.

20. The objective optical system of claim 6, wherein the following condition is satisfied:

d1>d2>d3.

21. The objective optical system of claim 6, wherein the following condition is satisfied:

d2>d3>d1.

22. The objective optical system of claim 6, wherein the following condition is satisfied:

d3>d1>d2.

23. The objective optical system of claim 6, wherein the diffractive optical surface diffracts light of maximum intensity for the first wavelength λ1 at a diffraction order that is different from the diffraction order of maximum intensity for the second wavelength λ2 and that is different from the diffraction order of maximum intensity for the third wavelength λ3.

24. The objective optical system of claim 23, wherein the diffractive optical surface:
diffracts light of the first wavelength λ1 with maximum intensity in a second-order diffracted beam;
diffracts light of the second wavelength λ2 with maximum intensity in a first-order diffracted beam; and
diffracts light of the third wavelength λ3 with maximum intensity in a first-order diffracted beam.

25. The objective optical system according to claim 6, wherein the diffractive surface is formed as a diffractive structure on a virtual plane that is perpendicular to the optical axis.

26. The objective optical system according to claim 6, wherein the diffractive optical element is made of plastic.

27. The objective optical system according to claim 6, wherein the diffractive optical element is made of glass.

28. The objective optical system according to claim 6, wherein the objective lens is made of plastic.

29. The objective optical system according to claim 6, wherein the objective lens is made of glass.

30. The objective optical system according to claim 6, wherein at least one surface of the objective lens is an aspheric surface.

31. The objective optical system according to claim 30, wherein the aspheric surface is a rotationally symmetric aspheric surface.

32. The objective optical system according to claim 6, wherein:
    the first optical recording medium is an AOD;
    the second optical recording medium is a DVD; and
    the third optical recording medium is a CD.

33. An optical pickup device that includes the objective optical system according to claim 6.

* * * * *

UNITED STATES PATENT AND TRADEMARK OFFICE
CERTIFICATE OF CORRECTION

PATENT NO. : 7,680,014 B2  
APPLICATION NO. : 10/972670  
DATED : March 16, 2010  
INVENTOR(S) : Ori et al.

Page 1 of 1

It is certified that error appears in the above-identified patent and that said Letters Patent is hereby corrected as shown below:

In the Specification

In col. 2  
Line 8, change "20(GB of data storage" to -- 20 GB of data storage --;

In col. 8  
Line 29, change "second 20 wavelength" to -- second wavelength --;

In col. 11  
Line 24, change

" $Z=[(C \cdot Y^2)/\{1+(1-K \cdot C^2 \cdot Y^2)^{1/2}\}]+\Sigma A_i \cdot Y^{2i}$  Equation (A)

to

-- $Z = [(C \cdot Y^2) / \{1 + (1 - K \cdot C^2 \cdot Y^2)^{1/2}\}] + \sum A_i \cdot Y^{2i}$  Equation (A) --;

In col. 19  
Line 47, change "5.1386804E-4" to -- 5.1380804E-4 --;

In the Claims

In col. 40  
Line 54, change "NA1 ≤NA2 ≤NA3" to -- NA1 ≥NA2 >NA3 --;

In col. 41  
Line 54, change "three distance distances" to -- three distances --; and In col. 42  
Line 16, change "d3 > d2" to -- d3 < d2 --.

Signed and Sealed this  
Twenty-second Day of October, 2013

Teresa Stanek Rea  
*Deputy Director of the United States Patent and Trademark Office*